(12) United States Patent
Takeuchi et al.

(10) Patent No.: US 7,978,273 B2
(45) Date of Patent: Jul. 12, 2011

(54) ACTIVE-MATRIX SUBSTRATE, DISPLAY DEVICE, AND TELEVISION RECEIVER

(75) Inventors: Masanori Takeuchi, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 444 days.

(21) Appl. No.: 12/159,972

(22) PCT Filed: Feb. 28, 2007

(86) PCT No.: PCT/JP2007/053818
§ 371 (c)(1),
(2), (4) Date: Jul. 2, 2008

(87) PCT Pub. No.: WO2007/102382
PCT Pub. Date: Sep. 13, 2007

(65) Prior Publication Data
US 2010/0225831 A1    Sep. 9, 2010

(30) Foreign Application Priority Data
Mar. 6, 2006 (JP) ................................. 2006-060055

(51) Int. Cl.
G02F 1/1343 (2006.01)
(52) U.S. Cl. .......................................... 349/39; 349/38
(58) Field of Classification Search .................. 349/39, 349/85
See application file for complete search history.

(56) References Cited

U.S. PATENT DOCUMENTS

| | | | |
|---|---|---|---|
| 5,380,555 A | 1/1995 | Mine et al. | |
| 6,014,190 A * | 1/2000 | Kim et al. | 349/39 |
| 6,229,516 B1 | 5/2001 | Kim et al. | |
| 7,119,776 B2 * | 10/2006 | Ishii et al. | 345/92 |
| 2002/0047822 A1 | 4/2002 | Senda et al. | |
| 2002/0196208 A1 | 12/2002 | Nanno et al. | |
| 2003/0214496 A1 | 11/2003 | Ishii et al. | |
| 2003/0227429 A1 | 12/2003 | Shimoshikiryo | |
| 2005/0122441 A1 | 6/2005 | Shimoshikiryoh | |

(Continued)

FOREIGN PATENT DOCUMENTS

| | | |
|---|---|---|
| JP | 10-102003 | 4/1998 |
| JP | 2001-098224 | 4/2001 |
| JP | 2002-333870 | 11/2002 |
| JP | 2003-330389 | 11/2003 |
| JP | 2005-189804 | 7/2005 |

OTHER PUBLICATIONS

Choi, D. K. et al, "Peformance of TFT Passivated with Low-K Dielectrics", IDW '03, p. 617, (2003).

(Continued)

Primary Examiner — Rhonda S Peace
(74) Attorney, Agent, or Firm — Nixon & Vanderhye P.C.

(57) ABSTRACT

An active-matrix substrate includes: scanning signal lines; data signal lines; first storage capacitor wires; second storage capacitor wires; and pixels, disposed at intersections between the scanning signal lines and the data signal lines, each of which includes a plurality of sub-pixels. Each of the data signal lines is split into two parts at a region where the number of scanning signal lines intersecting the data signal line is ½ of the total number of scanning signal lines. A data signal line split section is formed on a region that does not overlap the second storage capacitor wires. This makes it possible to provide an active-matrix substrate, a display device, and a television receiver in each of which a data signal line split into two parts and a storage capacitor wire are hardly electrically short-circuited in the case of a combination of a split-screen structure and a multi-pixel structure.

16 Claims, 17 Drawing Sheets

U.S. PATENT DOCUMENTS

| | | |
|---|---|---|
| 2005/0128404 A1 | 6/2005 | Lee |
| 2005/0184944 A1 | 8/2005 | Miyata et al. |
| 2005/0213015 A1 | 9/2005 | Shimoshikiryo |
| 2006/0256271 A1 | 11/2006 | Shimoshikiryo |
| 2008/0106657 A1* | 5/2008 | Kitayama et al. ............... 349/37 |
| 2008/0106660 A1* | 5/2008 | Kitayama et al. ............... 349/39 |
| 2009/0002585 A1* | 1/2009 | Shimoshikiryoh et al. ..... 349/39 |

OTHER PUBLICATIONS

International Search Report for PCT/JP2007/053818, mailed Jun. 12, 2007.

* cited by examiner

ACTIVE-MATRIX SUBSTRATE, DISPLAY DEVICE, AND TELEVISION RECEIVER

This application is the U.S. national phase of International Application No. PCT/JP2007/053818, filed 28 Feb. 2007, which designated the U.S. and claims priority to Japan Application No. 2006-060055, filed 6 Mar. 2006, the entire contents of each of which are hereby incorporated by reference.

TECHNICAL FIELD

The present invention relates to an active-matrix substrate, a display device, and a television receiver in each of which split-screen driving is performed.

BACKGROUND ART

As disclosed, for example, in Patent Document 1, there has conventionally been a liquid crystal display device in which a screen split into two parts is driven (such driving being hereinafter referred to as "split-screen driving"). That is, in order to improve image quality by sufficiently charging pixels by doubling the amount of time for applying data voltages to the pixels, Patent Document 1 discloses an arrangement in which: the conventional amount of time for supplying a scanning signal to each gate line is doubled; and a screen split into two parts is driven (such driving being hereinafter referred to as "split-screen driving") so that the amount of time conventionally required for a one-frame period is maintained.

FIG. 18 shows an arrangement (equivalent circuit diagram) of an active-matrix substrate 100 for use in a conventional liquid crystal display device disclosed in Patent Document 1. As shown in FIG. 18, the active-matrix substrate 100 includes: a plurality of scanning signal lines 101; a plurality of data signal lines 102 disposed so as to intersect the scanning signal lines 101; TFTs (thin-film transistors) 103 formed near intersections between the scanning signal lines 101 and the data signal lines 102, respectively; storage capacitor wires 104; and pixel electrodes 105. The active-matrix substrate 100 takes the form of a so-called "independent wiring system" in which the storage capacitor wires 104 are independently provided. Moreover, in the active-matrix substrate 100, each of the data signal lines 102 is split into two parts between a gate line G2, which is a scanning signal line 101, and a storage capacitor line S3, which is a storage capacitor wire 104.

Meanwhile, as disclosed in Patent Document 2, there has recently been a liquid crystal display device in which the dependence of γ characteristics on viewing angles is suppressed by splitting each pixel into two sub-pixels and by driving the two sub-pixels so that one of the sub-pixels serves as a bright sub-pixel of high luminance and the other sub-pixel serves as a dark sub-pixel of low luminance. Such a driving method is referred to, for example, as "multi-pixel driving".

According to the multi-pixel driving, while two sub-pixels of each pixel are supplied with identical data signal voltages, signal voltages opposite in phase to each other are applied as storage capacitances to the two sub-pixels, respectively, so that one of the sub-pixels is driven to serve as a bright sub-pixel of high luminance and the other sub-pixel is driven to serve as a dark sub-pixel of low luminance.

Patent Document 1: Japanese Unexamined Patent Application Publication No. 297564/1997 (Tokukaihei 9-297564; published on Nov. 18, 1997)

Patent Document 2: Japanese Unexamined Patent Application Publication No. 62146/2004 (Tokukai 2004-62146; published on Feb. 26, 2004)

Patent Document 3: Japanese Unexamined Patent Application Publication No. 173537/2005 (Tokukai 2005-173537; published on Jun. 30, 2005)

Patent Document 4: Japanese Unexamined Patent Application Publication No. 234552/2005 (Tokukai 2005-234552; published on Sep. 2, 2005)

Patent Document 5: Japanese Unexamined Patent Application Publication No. 98224/2001 (Tokukai 2001-98224; published on Apr. 10, 2001)

Patent Document 6: Japanese Unexamined Patent Application Publication No. 240455/1994 (Tokukaihei 6-240455; published on Aug. 30, 1994)

Patent Document 7: Japanese Unexamined Patent Application Publication No. 102003/1998 (Tokukaihei 10-102003; published on Apr. 21, 1998)

Non-patent Document 1: IDW '03 (The 10th International Display Workshops), Conference Proceedings, p. 617

DISCLOSURE OF INVENTION

Incidentally, in the case of an arrangement of an active-matrix substrate and a liquid crystal display device each including both a split-screen structure and a multi-pixel structure, the total number of storage capacitor wires is larger than the total number of scanning signal lines by 1.

In this case, as disclosed in Patent Document 1, it is necessary that upper and lower total capacitance loads respectively parasitic on upper and lower data signal lines $102u$ and $102d$ split from each other as shown in FIG. 18 be identical. Therefore, in order to efficiently dispose, in the active-matrix substrate and the liquid crystal display device each including both a split-screen structure and a multi-pixel structure, an arrangement in which capacitance loads respectively parasitic on the upper and lower data signal lines $102u$ and $102d$ split from each other are identical, it is necessary that the upper and lower data signal lines $102u$ and $102d$ be split from each other in a position that overlaps a storage capacitor wire 104.

However, for example, in process of manufacturing an active-matrix substrate, electrostatic discharge (ESD) may occur because regions split from each other have no place for charge to escape through; therefore, a storage capacitor wire may be undesirably short-circuited.

The present invention has been made in view of the foregoing problems, and it is an object of the present invention to provide an active-matrix substrate, a display device, and a television receiver in each of which a data signal line split into two parts and a storage capacitor wires are hardly electrically short-circuited in the case of a combination of a split-screen structure and a multi-pixel structure.

In order to solve the foregoing problems, an active-matrix substrate of the present invention includes: scanning signal lines; data signal lines; storage capacitor wires; and pixels, disposed at intersections between the scanning signal lines and the data signal lines, each of which includes a plurality of sub-pixels, each of the data signal lines being split into two parts at a region where the number of scanning signal lines is divided in half, each of the data signal lines having a split section formed in a region that does not overlap a storage capacitor wire.

According to the foregoing invention, the split section at which the data signal line is split into two parts does not overlap the storage capacitor wire. This makes it difficult for the storage capacitor wire to be electrically short-circuited with the data signal line split into two parts.

It should be noted that although the arrangement of the present invention causes such a difference in capacitance, by an overlap with a storage capacitor wire, between the data signal lines by which the capacitance load parasitic on the data signal line has been split, such a difference in capacitance is at such a level that a signal delay in the data signal line causes no serious defect in a display.

Further, the active-matrix substrate of the present invention is preferably arranged such that: the scanning signal lines are first to 2×mth (where m is an natural number except 0) scanning signal lines; each of the data signal lines is split into two parts between the mth scanning signal line and the m+1th scanning signal line; and the split section of each of the data signal lines is formed near the m storage capacitor wire provided between the mth scanning signal line and the m+1th scanning signal line.

According to the foregoing invention, the split section of each of the data signal lines is formed between the mth scanning signal line and the m+1th scanning signal line, and is formed near the m+1th storage capacitor wire provided between the mth scanning signal line and the m+1th scanning signal line. For this reason, there is substantially no difference in capacitance between the signal lines by which the electrostatic load capacitance parasitic on the data signal line has been split. For example, even in cases where such driving is performed that the upper- and lower-half regions differ in polarity, the difference in capacitance is surely at such a level that a signal delay in the data signal line causes no serious defect in a display.

Further, the active-matrix substrate of the present invention is preferably arranged such that: each of the sub-pixels has a sub-pixel electrode, interposed between two data signal lines, which is formed asymmetrically with respect to a center line of the sub-pixel electrode, the center line being parallel to the two data signal lines; each of the data signal lines has a diverging region where the data signal line diverges; and the split section of the data signal line is formed in the diverging region so as to equalize parasitic capacitances with respect to the two data signal lines adjacent to the asymmetrical sub-pixel electrode.

With this, specifically, in cases where a sub-pixel electrode is formed asymmetrically with respect to a center line of thereof between two data signal lines, it is possible to virtually eliminate a difference in capacitance between the data signal lines by which the capacitance load parasitic on the data signal line has been split.

Further, the active-matrix substrate of the present invention is preferably arranged such that: when each of the data signal lines is split at the split section into a first-half data signal line intersected by the first-half scanning signal lines and a second-half data signal line intersected by the second-half scanning signal lines, each of the data signal lines is split into two parts so that the value of a parasitic capacitance between (i) a pixel supplied with a voltage by the first-half data signal line intersected by the first-half scanning signal lines and (ii) the second-half data signal line intersected by the second-half scanning signal line is substantially identical to the value of a parasitic capacitance between (iii) a second-half data signal line, intersected by the second-half scanning signal lines, which is adjacent to the pixel and (iv) the pixel. As described above, "substantially identical" suffices as "identical".

With this, even in cases where the data signal line has an asymmetrical relationship with a sub-pixel electrode, it is possible to virtually eliminate a difference in capacitance between the data signal lines by which the capacitance load parasitic on the data signal line has been split.

Further, by inputting identical gradation voltages to a pixel region containing such a data signal line split section and a split-free pixel region free of a data signal line split section, it becomes possible that the pixel region and the split-free pixel region have identical luminances. This makes it possible to prevent a pixel region containing a data signal line split section from appearing as a bright line or a black line.

Further, the active-matrix substrate of the present invention is preferably arranged such that: the split section of each of the data signal lines is formed above a corresponding one of the storage capacitor wires; and the storage capacitor wire has a notch region formed in a portion where the storage capacitor wire and the split section overlap.

According to the foregoing invention, the total capacitance load parasitic on the data signal line can be equally split into the data signal lines split from each other.

Further, if the data signal lines split from each other are short-circuited, it is possible to destroy and separate the short-circuited portion by laser irradiation or the like.

Further, the active-matrix substrate of the present invention is preferably arranged such that each of the sub-pixels has a sub-pixel electrode having a notch region formed in a portion where the split section of each of the data signal lines and the sub-pixel electrode overlap.

According to the foregoing invention, even when electrostatic discharge destroys an interlayer insulating film between the sub-pixel electrode and the data signal line, it is possible to make it difficult for the second sub-pixel electrode and the data signal line to be short-circuited.

Further, the active-matrix substrate of the present invention is preferably arranged such that the notch region formed in the sub-pixel electrode serves as a slit section for controlling liquid crystal molecular alignment.

The foregoing invention makes it unnecessary to separately provide a notch region, for example, in the sub-pixel electrode, thereby making it possible to suppress a reduction in aperture ratio.

Further, the active-matrix substrate of the present invention is preferably arranged such that each of the data signal lines and a sub-pixel electrode of each of the sub-pixels are respectively included in planes separated by an interlayer insulating film.

Thus, if there are an interlayer insulating film between the sub-pixel electrode and the data signal line, it is possible to make it difficult for the sub-pixel electrode and the data signal line to be short-circuited with each other even at the time of electrostatic discharge.

Further, the active-matrix substrate of the present invention is preferably arranged such that the interlayer insulating film contains an insulating film made of a resin.

For example, whereas $SiN_X$, $SiO_2$, or the like formed by CVD or the like has difficulty in being shaped into a film having a thickness of the order of microns, a resin such as an acrylic resin is easily shaped in a film having a thickness of several microns. For this reason, it is possible to more suitably make it difficult for the sub-pixel electrode and the data signal line to be short-circuited with each other even at the time of electrostatic discharge. Furthermore, the film can be made thicker, and the parasitic capacitance between the sub-pixel electrode and the data signal line can be suitably reduced.

Further, whereas the relative permittivity of $SiN_X$ is approximately 7.0, the relative permittivity of an available acrylic resin is approximately 3.0. Therefore, the parasitic capacitance can be suitably reduced also in terms of relative permittivity.

Further, the active-matrix substrate of the present invention is preferably arranged such that the interlayer insulating film contains an insulating film made of a spin-on glass (SOG) material.

For example, whereas $SiN_X$, $SiO_2$, or the like formed by CVD or the like has difficulty in being shaped into a film having a thickness of the order of microns, a spin-on glass (SOG) material having a Si—O—C bond or a Si—C bond as its skeleton is easily shaped into a film having a thickness of several microns.

For this reason, it is possible to more suitably make it difficult for the sub-pixel electrode and the data signal line to be short-circuited with each other even at the time of electrostatic discharge. Furthermore, the film can be made thicker, and the parasitic capacitance between the sub-pixel electrode and the data signal line can be suitably reduced.

Further, whereas the relative permittivity of $SiN_X$ is approximately 7.0, the relative permittivity of an available spin-on glass material is approximately 4.0.

Further, in order to solve the foregoing problems, a display device of the present invention include such an active-matrix substrate as described above.

Further, in order to solve the foregoing problems, a television receiver of the present invention includes such a display device as described above and a tuner section for receiving a television broadcast.

This makes it possible to provide a liquid crystal display device and a television receiver each including an active-matrix substrate in which a data signal line split into two parts and a second storage capacitor wire are hardly electrically short-circuited in the case of a combination of a split-screen structure and a multi-pixel structure.

Further, the display device of the present invention is preferably arranged such that: the sub-pixels consist of a first sub-pixel having a first sub-pixel electrode connected to a drain electrode of a first transistor and a second sub-pixel electrode connected to a drain electrode of a second transistor; the first sub-pixel forms a first storage capacitance between the first sub-pixel electrode and a first storage capacitor wire, which is a storage capacitor wire disposed on the first sub-pixel electrode, and the second sub-pixel forms a second storage capacitance between the second sub-pixel electrode and a second storage capacitor wire, which is a storage capacitor wire disposed on the second sub-pixel electrode; and by performing potential control on each of the storage capacitor wires individually, the potential of the first sub-pixel electrode and the potential of the second sub-pixel electrode are each controlled individually.

According to the foregoing invention, by performing potential control on each of the storage capacitor wires individually, the potential of the first sub-pixel electrode and the potential of the second sub-pixel electrode are each controlled individually.

With this, for example, the first sub-pixel can be made bright and the second sub-pixel can be made dark. This makes it possible to realize split-pixel driving for improving the dependence of γ characteristics on viewing angles. Further, the dependence of γ characteristics on viewing angles in an upward direction and the dependence of γ characteristics on viewing angles in a downward direction can be made substantially equal.

Further, the display device of the present invention is arranged such that the storage capacitor wire voltage control sections control the potential of each of the storage capacitor wires so that the potential rises or falls after the first or second transistor has been turned off and the rise or fall continues until the first or second transistor is turned off in a next frame.

This causes a reduction in the influence on drain effective potential by the bluntness of the waveforms of the voltages of the storage capacitor wires, thereby effectively reducing unevenness of luminance.

Additional objects, features, and strengths of the present invention will be made clear by the description below. Further, the advantages of the present invention will be evident from the following explanation in reference to the drawings.

BRIEF DESCRIPTION OF DRAWINGS

FIG. 6($b$) is a timing chart showing a state in which the liquid crystal display device is driven in the N+1th frame.

FIG. 7($b$) is a timing chart showing another state in which the liquid crystal display device is driven in the N+1th frame.

REFERENCE NUMERALS

Figure 1:
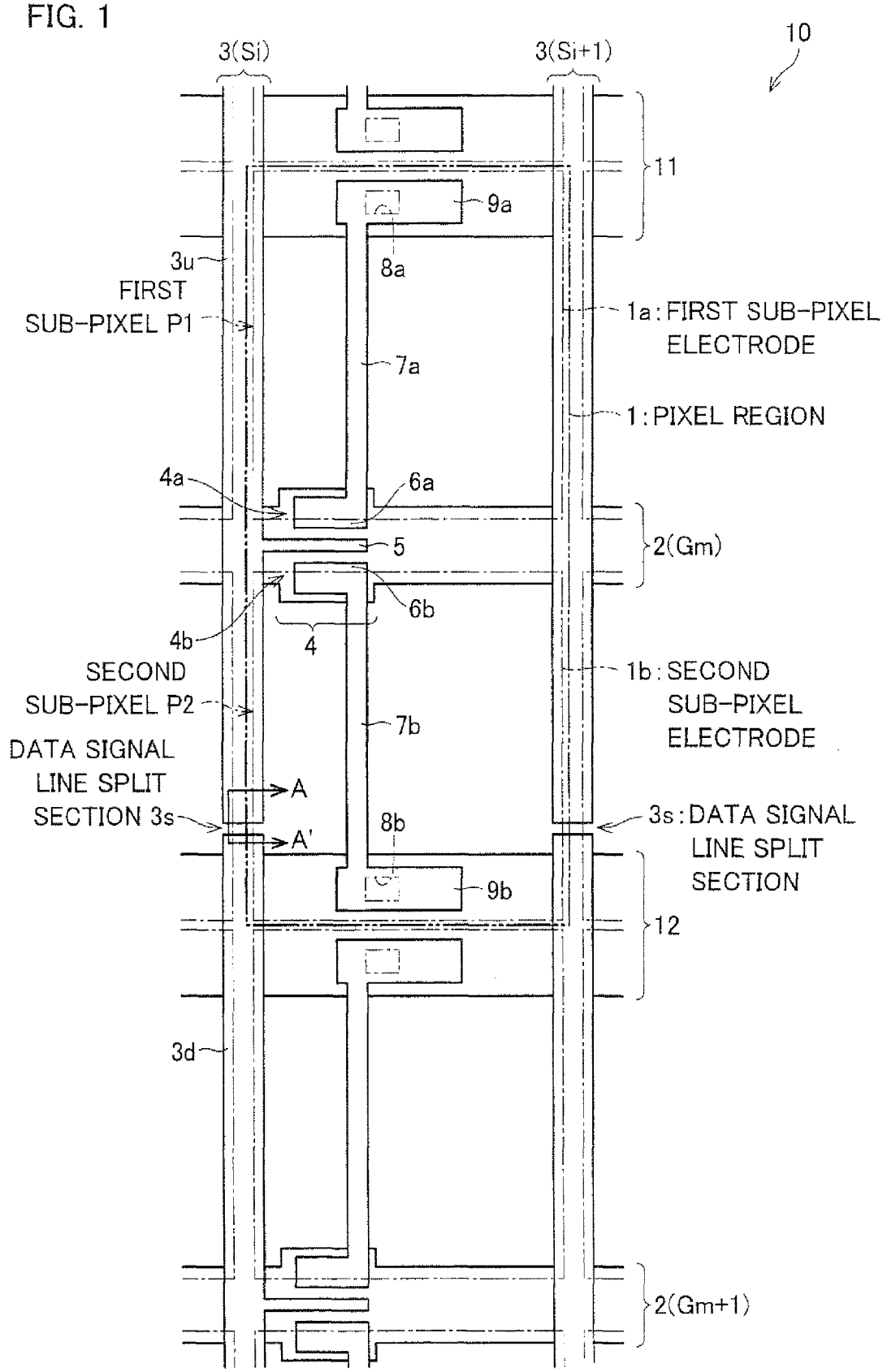
FIG. 1 is a plan view of an embodiment of an active-matrix substrate according to the present invention.

1 Pixel region
1$a$ First sub-pixel electrode
1$b$ Second sub-pixel electrode
2 Scanning signal line
3 Data signal line
3$d$ Lower data signal line 3s Data signal line split section (split section)
3u Upper data signal line
4 TFT
4a First TFT (first transistor)
4b Second TFT (second transistor)
6a First drain electrode (drain electrode)
6b Second drain electrode (drain electrode)
7a First drain lead wire
7b Second drain lead wire
9a Electrode on a first storage capacitor wire
9b Electrode on a second storage capacitor wire
10 Active-matrix substrate
11 First storage capacitor wire
12 Second storage capacitor wire
15a Resin film (interlayer insulating film)
15b Inorganic insulating film (interlayer insulating film)
20 Liquid crystal display device (display device)
25a Upper CS control circuit (storage capacity wire voltage control section)
25b Lower CS control circuit (storage capacity wire voltage control section)
30 Active-matrix substrate
32a Storage capacitor wire notched section (notch region)
40 Active-matrix substrate
41 Pixel electrode notched section (notch region)
50 Active-matrix substrate
60 Active-matrix substrate
70 Liquid crystal display device (display device)
80 Television receiver
81 Tuner section
P1 First sub-pixel (sub-pixel)
P2 Second sub-pixel (sub-pixel)

BEST MODE FOR CARRYING OUT THE INVENTION

Embodiment 1

An embodiment of the present invention will be described below with reference to FIGS. 1 through 10.

According to the present embodiment, an active-matrix substrate, a liquid crystal display device serving as a display device, and a television receiver each have a so-called multi-pixel structure in which each pixel is split into two or more sub-pixels.

That is, in the multi-pixel structure, a pixel is split into two or more sub-pixels, and the sub-pixels are driven individually. Such a mode in which a pixel is constituted by two or more sub-pixels is an advantageous mode because a reduction in proportion of normal pixels can be suppressed, for example, even if a correction is made in response to the occurrence of a defect in a pixel.

Further, in cases where the multi-pixel structure is applied, it is preferable that at least two of the sub-pixels have different luminances. According to this mode, a single pixel contains both a bright sub-pixel and a dark sub-pixel. Therefore, an intermediate gradation can be expressed by an area gradation. The mode is suitable to preventing a liquid crystal display from appearing excessively bright when seen from an oblique viewing angle.

Furthermore, the active-matrix substrate of the present embodiment that employs the multi-pixel structure is provided with two or more storage capacitor wires to which signal voltages opposite in phase to each other are applied. The two or more storage capacitor wires are structured so as to overlap, via an insulating layer, pixel electrodes corresponding to different sub-pixels. Such a mode is suitable to forming a bright sub-pixel and a dark sub-pixel. The "signal voltages, opposite in phase to each other, which are applied to the two or more storage capacitor wires" here mean those waveform voltages of storage capacitors Cs which are used, in pixels of a split-pixel structure, for manipulating area gradations. Here are two types of waveform voltage. One is that waveform voltage of a storage capacitor Cs which, at a timing of performing capacitor coupling after a gate signal is off, causes a rise in drain signal voltage (Vs) supplied from a source (the storage capacitor Cs having a positive polarity). The other is that waveform voltage of a storage capacitor Cs which, at a timing of performing capacitor coupling after a gate signal is off, causes a fall in drain signal voltage (Vs) supplied from the source (the storage capacitor Cs having a negative polarity).

According to such a split-pixel method (area gradation technique), the effective voltage to each pixel is changed for each sub-pixel by the waveform voltage of a storage capacitor Cs and the capacity coupling of the storage capacitor Cs and a liquid crystal capacitor, so that bright and dark sub-pixels are formed. This makes it possible to realize the multi-pixel driving. For details of such a split-pixel method (area gradation technique), see Patent Document 2 and the like.

Examples of the split-screen structure include a 1:1 split-screen structure in which the area of bright sub-pixels is equal to the area of dark sub-pixels and a 1:3 split-screen structure in which the area of bright sub-pixels is ⅓ of the area of dark sub-pixels. Among them, the 1:3 split-screen structure is especially effective in preventing a liquid crystal display screen from appearing excessively bright when seen from an oblique viewing angle (in improving a viewing angle).

Further, according to the present embodiment, the active-matrix substrate, the liquid crystal display device serving as a display device, and the television receiver each drive a screen split into two parts (such driving being hereinafter referred to as "split-screen driving").

That is, according to the present embodiment, as described in detail below, a liquid crystal display device serving as a hold display device performs pseudo-impulse driving by splitting a one-frame period into a first-half frame and a second-half frame and by displaying the first-half frame brightly while displaying the second-half frame darkly. Examples of conventional technologies for performing the pseudo-impulse driving include Patent Documents 3 and 4. Moreover, in order to improve the response to the entire display screen in performing driving in a one-frame period split into a first-half frame and a second-half frame, the present embodiment drives a screen split into two parts.

The active-matrix substrate, the liquid crystal display device, and the television receiver thus arranged will be specifically described in detail below.

<Arrangement>

FIG. 1 is a plan view of an arrangement of an active-matrix substrate 10 of the present embodiment, and shows the vicinity of a region where each data signal line 3 is split into two parts.

As shown in FIG. 1, the active-matrix substrate 10 includes: pixel regions 1 disposed in a matrix manner; scanning signal lines 2 (in rows, in a latitudinal direction of FIG. 1); data signal lines 3 (in columns, in a longitudinal direction of FIG. 1) intersecting the scanning signal lines 2 perpendicularly; a first storage capacitor 11; and a second storage capacitor wire 12.

Each of the pixel regions 1 has a TFT (thin-film transistor) 4, provided at an intersection of a scanning signal line 2 and a data signal line 3, which serves as a switching element, i.e., as an active element. Serving as an active element, the TFT 4 includes: the scanning signal line 2, which functions as a gate electrode; a source electrode 5 connected to the data signal line 3; first and second drain electrodes 6a and 6b facing each other. As a result, the TFT 4 includes: a first TFT 4a constituted by the source electrode 5, the gate electrode connected to the scanning signal line 2, and the first drain electrode 6a; and a second TFT 4b constituted by the source electrode 5, the gate electrode connected to the scanning signal line 2, and the second drain electrode 6b.

Moreover, the first and second drain electrodes 6a and 6b are connected to first and second drain lead wires 7a and 7b made of a conductive layer constituting a wiring section, respectively. The first and second drain lead wires 7a and 7b are connected to first and second sub-pixel electrodes 1a and 1b via first and second contact holes 8a and 8b passing through an interlayer insulating film, respectively. In the case of a 37-inch (=94 cm) liquid crystal display device at 690× 540 dots, the size of each pixel is 284 μm×854 μm, and the size of each of its first and second sub-pixel electrodes 1a and 1b is approximately ½ of the size of the pixel.

According to the present embodiment, each of the data signal lines 3 is split into lower and upper data signal lines 3u and 3d at a data signal line split section serving as a split section near that portion of FIG. 1 which is above the second storage capacitor wire 12.

Figure 2:
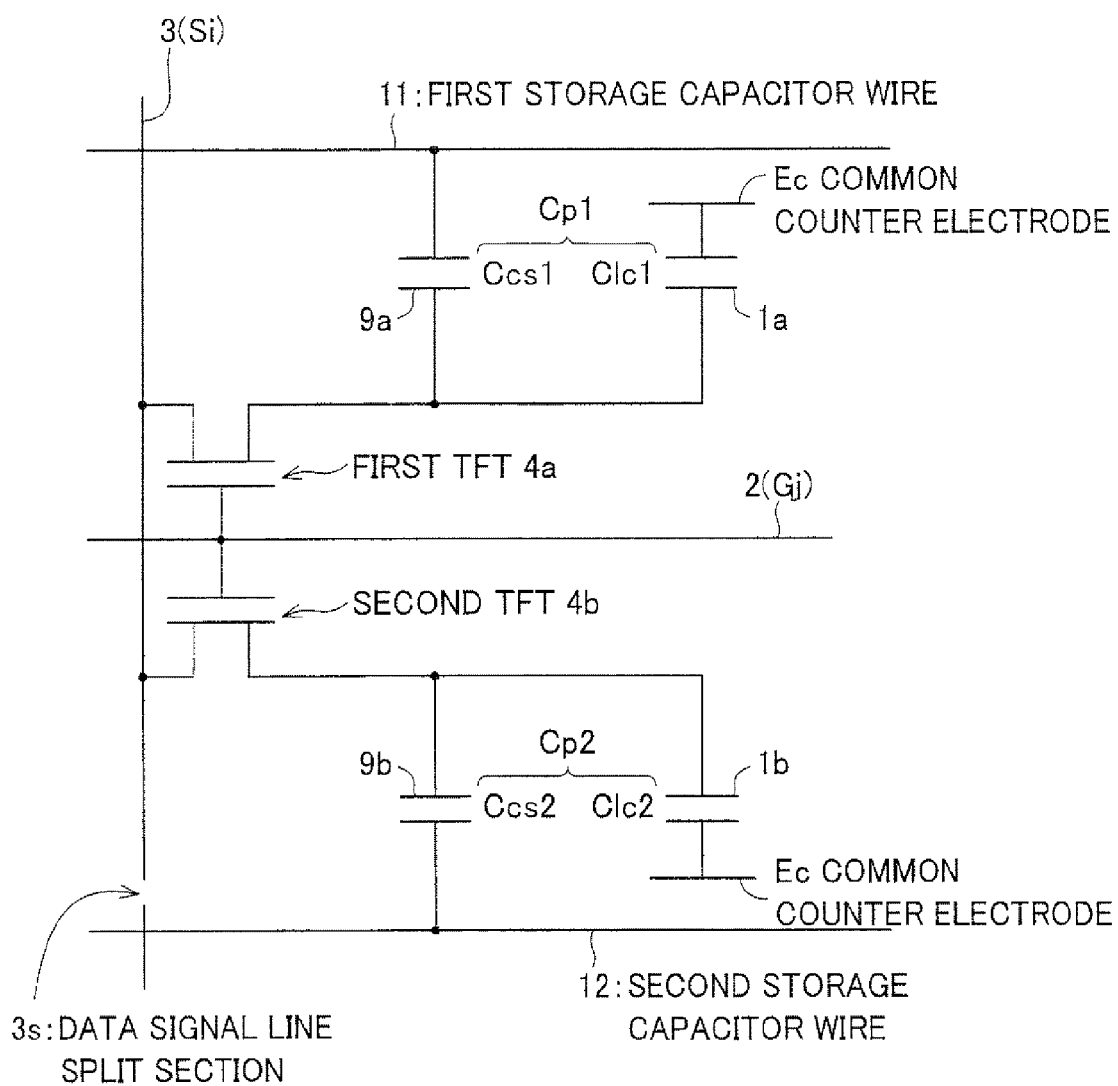
FIG. 2 is an equivalent circuit diagram showing an arrangement of a pixel of the active-matrix substrate.

In a pixel of a liquid crystal display device (liquid crystal panel) employing an active-matrix substrate thus arranged, a circuit shown in FIG. 2 is realized.

That is, as shown in FIG. 2, the first sub-pixel electrode 1a is connected to the data signal line 3 via the first TFT 4a and the second sub-pixel electrode 1b is connected to the data signal line 3 via the second TFT 4b. It should be noted that the respective gate electrodes of the first and second TFTs 4a and 4b are both connected to the scanning signal line 2. Further, a first storage capacitor Ccs1 is formed between (i) an electrode 9a so formed on the first capacitor wire 11 as to be connected to the first sub-pixel electrode 1a and (ii) the first storage capacitor wire 11, and a second storage capacitor Ccs2 is formed between (iii) an electrode 9b so formed on the second capacitor wire 12 as to be connected to the second sub-pixel electrode 1b and (iv) the second storage capacitor wire 12. It should be noted that the first and second storage capacitor wires 11 and 12 are supplied with different storage capacitance signals (auxiliary capacitance counter voltages).

As shown in FIG. 2, pixel capacitors (first and second sub-pixel capacitors Cp1 and Cp2) are constituted by (i) liquid crystal capacitors (first and second liquid crystal capacitors Clc1 and Clc2) formed by the first and second sub-pixel electrodes 1a and 1b and common counter electrodes Ec and (ii) the storage capacitors (first and second storage capacitors Ccs1 and Ccs2), respectively.

<Manufacturing Method>

Figure 3:
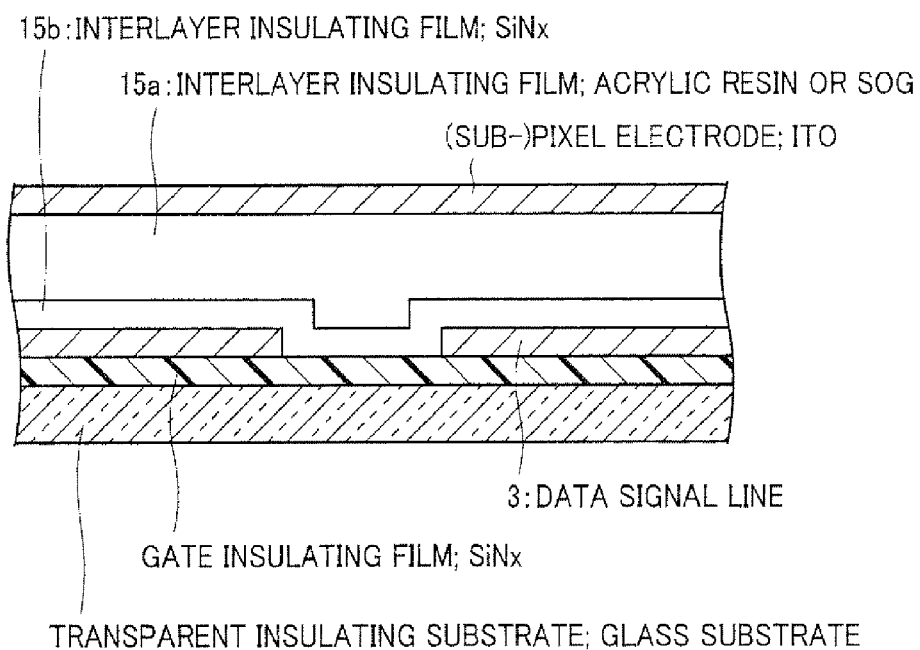
FIG. 3 is a cross-sectional view of an arrangement of the active-matrix substrate taken along Line A-A' of FIG. 1.

A basic part of a method for manufacturing an active-matrix substrate 10 thus arranged will be described below with reference to FIG. 3. FIG. 3 is a cross-sectional view of a cross-section of the data signal line split section 3s as taken along Line A-A' of FIG. 1.

According to the present embodiment, as shown in FIG. 3, the scanning signal line 2, which also functions as a gate electrode of a TFT, is provided on a transparent insulating substrate made of glass, plastic, or the like. The scanning signal line 2 and the gate electrode are formed by forming a film of metal such as titanium, chromium, aluminum, molybdenum, tantalum, tungsten, or copper, a film of alloy thereof, or a film of lamination thereof by sputtering or the like so that the film has a thickness of 1000 Å to 3000 Å and by shaping the film into a desired pattern by photo-etching or the like.

Then, a silicon nitride film (SiN) serving as a gate insulating film, a high-resistance semiconductor layer made of amorphous silicon, polysilicon, or the like, and a low-resistance semiconductor layer (not shown) made of $n^+$ amorphous silicon or the like are continuously formed by plasma CVD (chemical vapor deposition) or the like and shaped into patterns by photo-etching or the like. Examples of film thicknesses are as follows: the silicon nitride film (SiN) serving as the gate insulating film has a thickness of approximately 3000 Å to 5000 Å; the amorphous silicon film serving as the high-resistance semiconductor layer has a thickness of approximately 1000 Å to 3000 Å; and the $n^+$ amorphous silicon film serving as the low-resistance semiconductor layer has a thickness of approximately 400 Å to 700 Å.

Next, the data signal line 3, the source electrode 5, the first and second drain electrodes 6a and 6b, the first and second drain lead wires 7a and 7b, and the electrodes 9a and 9b are formed by the same step. The data signal line 3, the source electrode 5, the first and second drain electrodes 6a and 6b, the first and second drain lead wires 7a and 7b, and the electrodes 9a and 9b are formed by forming a film of metal such as titanium, chromium, aluminum, molybdenum, tantalum, tungsten, or copper, a film of alloy thereof, or a film of lamination thereof by sputtering or the like so that the film has a thickness of 1000 Å to 3000 Å and by shaping the film into a desired pattern by photo-etching or the like.

The first and second TFTs 4a and 4b are formed by masking the high-resistance semiconductor layer such as the amorphous silicon film and the low-resistance semiconductor layer such as the $n^+$ amorphous silicon film with the patterns of the data signal line 3, the source electrode 5, the first and second drain electrodes 6a and 6b, and the first and second drain lead wires 7a and 7b and by performing channel etching by dry etching.

Furthermore, a resin film made of a photosensitive acrylic resin or the like is provided as an interlayer insulating film 15a, and an inorganic layer made of silicon nitride, silicon oxide, or the like or a film of lamination thereof is provided as an interlayer insulating film 15b. Usable examples of the film of lamination include a film of lamination of a silicon nitride film so formed by plasma CVD as to have a thickness of approximately 2000 Å to 5000 Å and a photosensitive acrylic resin film so formed on the silicon nitride film by spin coating as to have a thickness of 20000 Å to 40000 Å.

The first and second contact holes 8a and 8b are formed so as to pass through the interlayer insulating film so formed as to cover the first and second TFTs 4, the scanning signal line 2, the data signal line 3, the source electrode 5, the first and second drain electrodes 6a and 6b, the first and second drain lead wires 7a and 7b, and the electrodes 9a and 9b. The first and second contact holes 8a and 8b are formed by patterning by photo-etching.

Moreover, the first and second sub-pixel electrodes 1a and 1b are formed on an interlayer insulating film by forming a transparent conductive film of ITO (indium tin oxide), IZO, zinc oxide, tin oxide, or the like by sputtering or the like so that the film has a thickness of approximately 1000 Å to 2000 Å and by shaping the film into a desired pattern. For example, in cases where the film is used for an MVA liquid crystal display device, the film is shaped into a pattern containing slits for use in alignment control.

Although the present embodiment uses a silicon nitride insulating film as an interlayer insulating film, the present embodiment is not limited to this. For example, a photosensitive acrylic resin film, a resin film of other polyimide or the like, or a nonphotosensitive resin layer may be formed by photo-etching. Alternatively, a spin-on glass (SOG) film may be formed. The following describes a manufacturing method to be employed in cases where spin-on glass (SOG) is used as an interlayer insulating film.

First, a planarizing film such as a spin-on glass (SOG) material is applied by spin coating.

For example, a spin-on glass material containing an organic constituent (i.e., an organic spin-on glass (SGO) material) can be suitably used. Especially, a spin-on glass (SOG) material having a Si—O—C bond or a Si—C bond as its skeleton can be suitably used. The "spin-on glass (SOG) material" here means a material from which a glass film (silica-based film) can be formed by a coating method such as spin coating. An organic spin-on glass (SOG) material has a low relative permittivity and can be easily shaped into a thick film. Therefore, use of an organic spin-on glass (SOG) material makes it easy to reduce the relative permittivity of an interlayer insulating film, to form an interlayer insulating film thickly, and to reduce the parasitic capacitance between a (sub-)pixel electrode and a data signal line. Usable examples of the spin-on glass (SOG) material having a Si—O—C bond as its skeleton include a material disclosed in Patent Document 5 or 6 and a material disclosed in Non-patent Document 1 (named "DD1100"; manufactured by Dow Corning Toray Silicone Co., Ltd.). Usable examples of the spin-on glass (SOG) material having a Si—C bond as its skeleton include a material disclosed in Patent Document 7.

Specifically, an organic spin-on glass material is applied so as to have a thickness of 1.5 μm to 3.5 μm. Then, a desired pattern is obtained by photo-etching. The etching is performed by dry etching with a mixed gas of carbon tetrafluoride ($CF_4$) and oxygen ($O_2$), so that the organic SOG is removed.

<Method for Forming a Panel>

Figure 4:
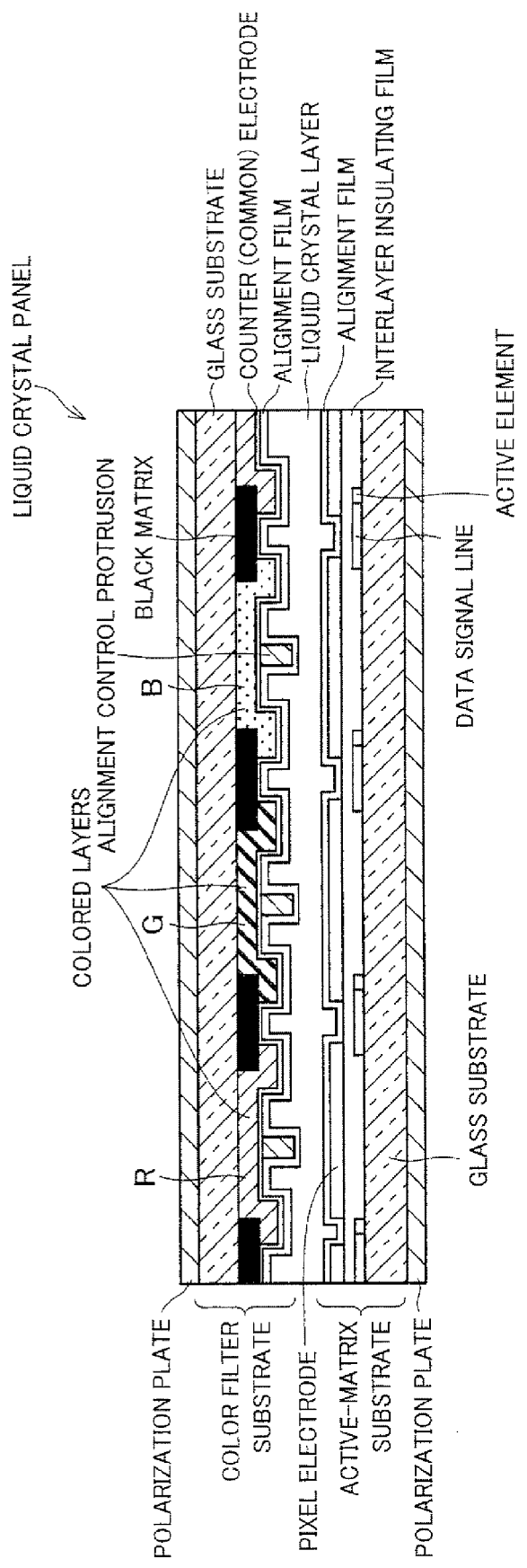
FIG. 4 is a cross-sectional view of an arrangement of a liquid crystal panel of a liquid crystal display device including the active-matrix substrate.

A method for sealing liquid crystals in a space between an active-matrix matrix substrate 10 and a color filter substrate in order to form a panel will be described below with reference to FIG. 4.

Examples of the method for sealing in liquid crystals include a vacuum injection method. According to the vacuum injection method, a thermosetting sealing resin is provided around the substrates so as to have an inlet through which liquid crystals are injected. Next, the inlet is immersed in liquid crystals in a vacuum. Then, the liquid crystals are injected by leaving the inlet open to the atmosphere. Finally, the inlet is sealed with a UV cure resin or the like. However, a vertical-alignment liquid crystal display panel suffers from the disadvantage of requiring a longer injection time than a horizontal-alignment liquid crystal display panel. The following describes a liquid crystal dropping and laminating method.

A UV cure sealing resin is applied to the periphery of the active-matrix substrate 10, and liquid crystals are dropped onto the color filter by a dropping method. Into a space surrounded by the seal, the liquid crystals are regularly dropped by a liquid crystal dropping method in such appropriate amounts as to form a desired cell gap.

Furthermore, in order to laminate the color filter substrate onto which the liquid crystals have been dropped and the active-matrix substrate 10 around which the seal has been drawn and onto which the liquid crystals have been dropped, the atmosphere inside a laminating apparatus is depressurized to 1 Pa. After the substrates have been laminated under such reduced pressure, the atmosphere is brought back to normal pressure. In the result, the sealed portion is crushed so as to obtain the desired cell gap.

Then, the structure whose sealed portion has obtained the desired cell gap is irradiated with UV by a UV curing apparatus so that the sealing resin is hardened temporarily. Furthermore, the sealing resin is hardened permanently by performing baking. At this point of time, the liquid crystals pervade the inside of the sealing resin, so that the cell is filled with the liquid crystals. After completion of the baking, the structure is divided into individual liquid crystal panels, and a polarization panel is laminated on each of the liquid crystal panels. In the result, such a liquid crystal panel as shown in FIG. 3 is completed.

As described above, a liquid crystal display panel is formed by laminating an active-matrix substrate 10 and a color filter substrate formed so as to include red (R), green (G), and blue (B) colored layers provided in a matrix manner so as to correspond to pixels of the active-matrix substrate 10 and light-blocking black matrices provided between the colored layers and by injecting and sealing in liquid crystals.

By connecting a driver (liquid crystal driving LSI) and the like to the liquid crystal panel and by mounting a polarization plate and a backlight, a liquid crystal display device 20 of the present embodiment is formed.

<Operation>

Figure 5:
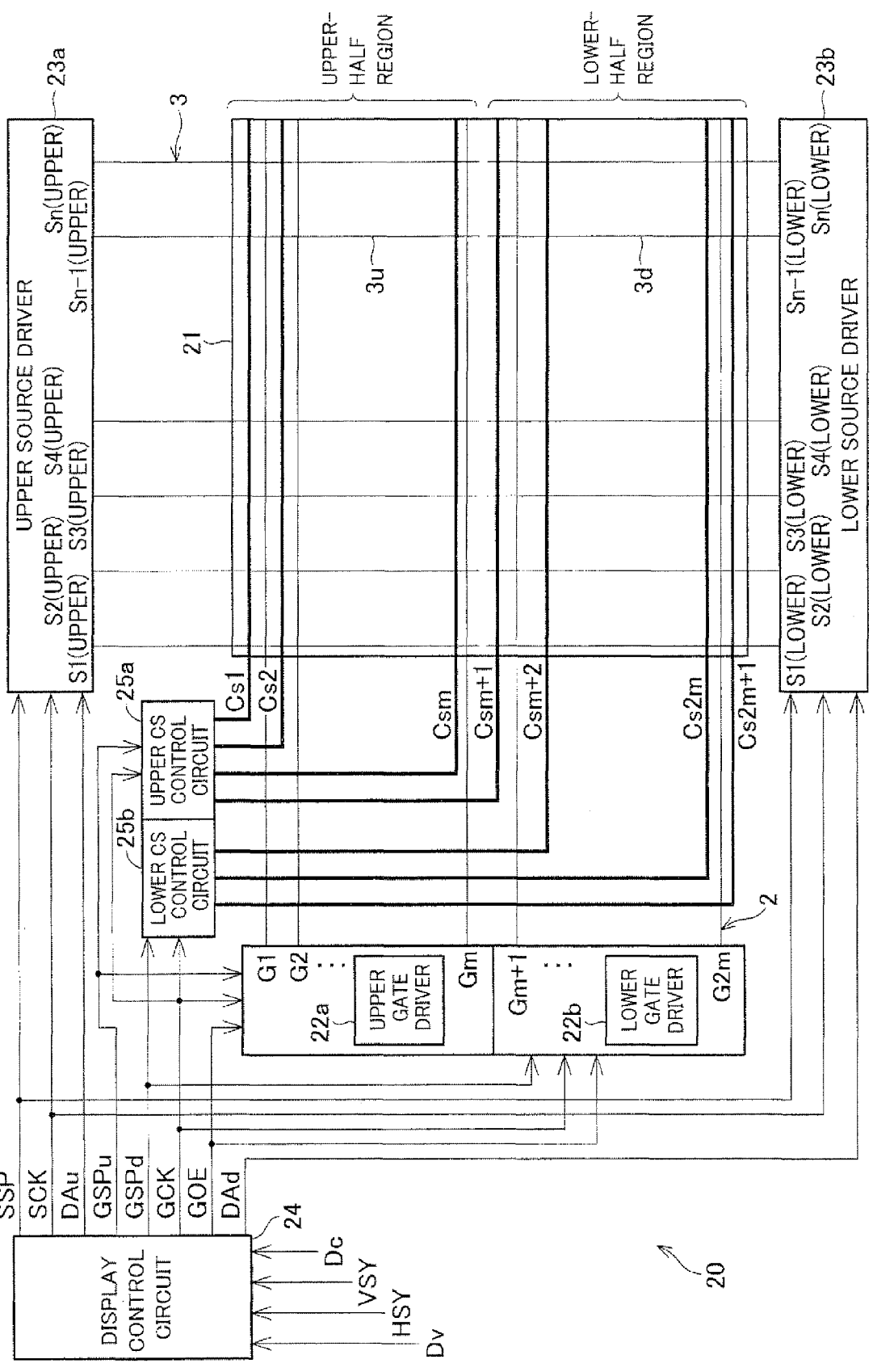
FIG. 5 is a block diagram showing an entire arrangement of the liquid crystal display device including the active-matrix substrate.
Figure 6:
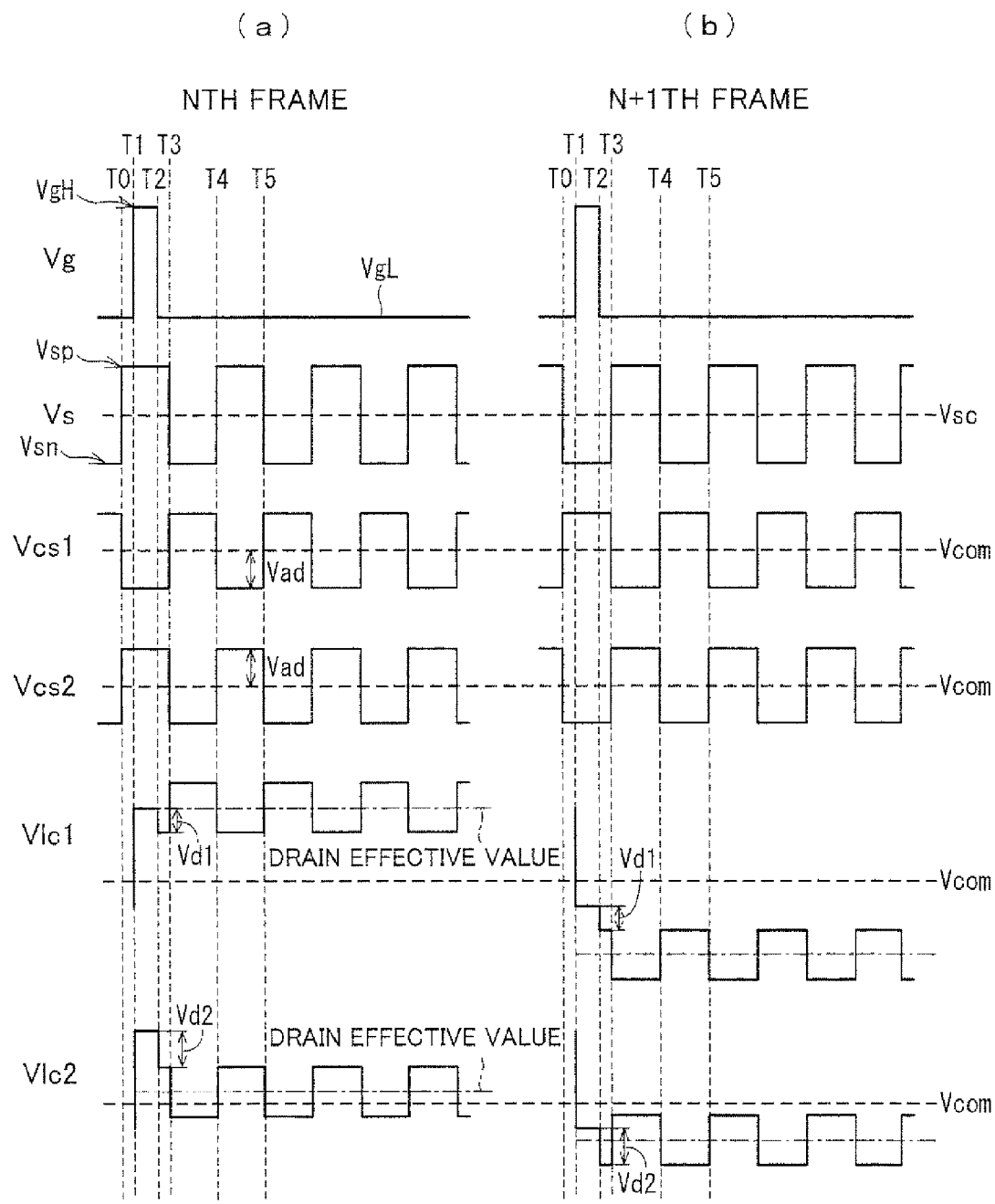
FIG. 6($a$) is a timing chart showing a state in which the liquid crystal display device is driven in the Nth frame.
Figure 7:
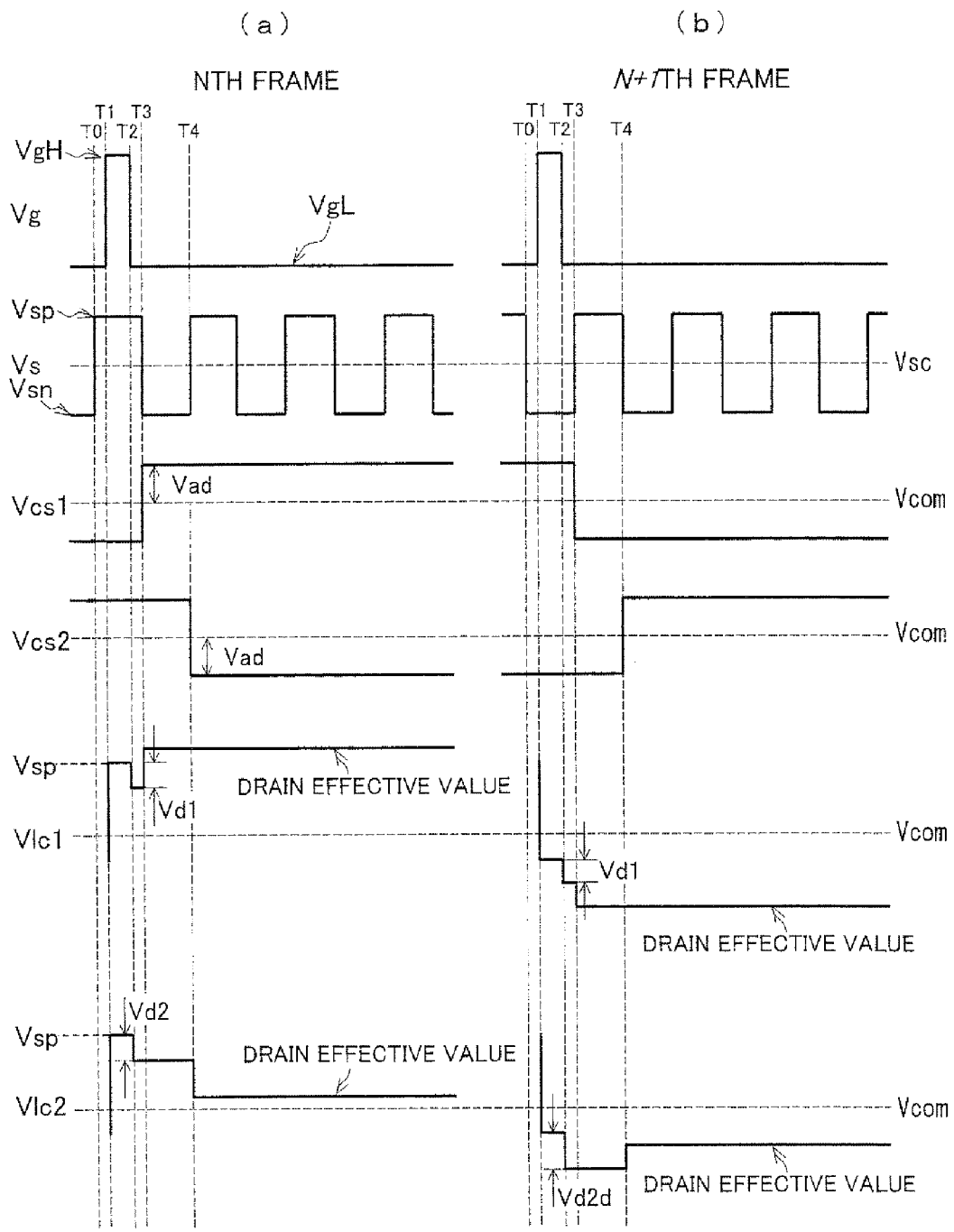
FIG. 7($a$) is a timing chart showing another state in which the liquid crystal display device is driven in the Nth frame.

A method for driving a liquid crystal display device according to the present embodiment will be described below with reference to FIG. 5. FIG. 5 is a block diagram showing an arrangement of the liquid crystal display device and a display section thereof.

The liquid crystal display device 20 includes: data signal lines 3 split into an upper-half region and a lower-half region near the center of a display region; upper and lower source drivers 23a and 23b respectively serving as upper and lower data signal line driving circuits; upper and lower data drivers 22a and 22b each serving as a scanning signal line driving circuit; an active-matrix display section 21; and a display control circuit 24 for controlling the upper and lower source drivers 23a and 23b, the upper and lower data drivers 22a and 22b, and upper and lower CS (storage capacitor line) control circuits 25a and 25b.

The display section 21 includes: a plurality (2m (where m is an integer of not less than 1)) of gate lines G1 to G2m serving as scanning signal lines 2; a plurality (2m+1) of storage capacitor lines CS1 to CS2m+1 serving as first and second storage capacitor wires 11 and 12; a plurality (n) of source lines S1(UPPER) to Sn(UPPER) and a plurality (n) of source lines S1(LOWER) to Sn(LOWER), serving as data signal lines 3, which intersect the gate lines G1 to G2m and the storage capacitor lines CS1 to CS2m+1 (hereinafter (UPPER) and (LOWER) being sometimes referred to collectively as "source lines Si to Sn"); a plurality (2m×n) of such pixel regions 1 as described above, the pixel regions 1 being provided so as to correspond to intersections between the gate lines G1 to G2m and the source lines S1 to Sn, respectively; and a plurality (2×2m×n) sub-pixels each obtained by splitting a single pixel region 1 into two parts.

These pixel-forming sections are disposed in a matrix manner so as to constitute a pixel array. As shown in FIG. 2, each of the pixel-forming sections includes: first and second TFTs 4a and 4b each serving as a switching element in which a gate terminal is connected to a gate line Gj serving as a scanning signal line 2 passing through a corresponding intersection and a source terminal is connected to a source line Si serving as a data signal line 3 passing through the corresponding intersection; first and second sub-pixel electrodes 1a and 1b connected to drain terminals of the first and second TFTs 4a and 4b, respectively; common counter electrodes Ec serving as counter electrodes provided commonly in the plurality of pixel-forming sections; and a liquid crystal layer sandwiched between the first and second sub-pixel electrodes 1a and 1b and the counter electrodes provided commonly in the plurality of pixel-forming sections. Moreover, as described above, pixel capacitors (first and second sub-pixel capacitors Cp1 and Cp2) are constituted by (i) liquid crystal capacitors (first and second liquid crystal capacitors Clc1 and Clc2) formed by the first and second sub-pixel electrodes 1a and 1b and common counter electrodes Ec and (ii) the storage capacitors (first and second storage capacitors Ccs1 and Ccs2), respectively.

The upper and lower source drivers 23a and 23b and the upper and lower gate drivers 22a and 22b supply the first and second sub-pixel electrodes 1a and 1b of each of the pixel-forming sections with a potential corresponding to an image to be displayed, and a power supply circuit (not shown) supplies the common counter electrodes Ec with a predetermined potential Vcom (counter voltage). With this, a voltage corresponding to the difference in potential between the first and second sub-pixel electrodes 1a and 1b and the common counter electrodes Ec is applied to the liquid crystals, and the amount of light to be transmitted by the liquid crystal layer is controlled by the voltage application, so that the image is displayed. However, it is assumed here that a polarization plate is used to control the amount of transmitted light by applying the voltage to the liquid crystal layer, and that the polarization plate is disposed in the liquid crystal display device of the present basic arrangement so that the liquid crystal display device is normally black.

Next, the display control circuit 24 shown in FIG. 5 receives, from an external signal source, a digital video signal Dv, a horizontal synchronizing signal HSY corresponding to the digital video signal Dv, a vertical synchronizing signal VSY corresponding to the digital video signal Dv, and a control signal Dc for controlling a display operation. In accordance with the video signal Dv, the horizontal synchronizing signal HSY, the vertical synchronizing signal VSY, and the control signal Dc, the display control circuit 24 generates and outputs signals for causing the display section 21 to display an image represented by the digital video signal Dv. The signals are a data start pulse signal SSP, a data clock signal SCK, digital image signals DAu and DAd representing an image to be displayed (digital image signals DAu and DAd being obtained by assigning, to the upper-half region and the lower-half region, a signal corresponding to the digital video signal Dv), gate start pulse signals GSP (a gate start pulse signal GSPu for use in the upper-half region and a gate start pulse signal GSPd for use in the lower-half region), a gate clock signal GCK, and a gate driver output control signal GOE.

More specifically, after the digital video signal Dv is subjected to timing adjustment or the like by an internal memory as needed, the digital image signals DAu and DAd are outputted from the display control circuit 24 The data clock signal SCK is generated as a signal composed of pulses respectively corresponding to pixels of the image represented by the digital image signals DAu and DAd. The data start pulse signal SSP is generated as a signal that is at a high level (H level) during a predetermined period for every horizontal scanning period in accordance with the horizontal synchronizing signal HSY. The gate start pulse signals GSP (the gate start pulse signal GSPu for use in the upper-half region and the gate start pulse signal GSPd for use in the lower-half region) are generated as signals that are at an H level during a predetermined period for every one-frame period (vertical scanning period) in accordance with the vertical synchronizing signal VSY. The gate clock signal GCK is generated in accordance with the horizontal synchronizing signal HSY. The gate driver output control signal GOE is generated in accordance with the horizontal synchronizing signal HSY and the control signal Dc.

As described above, among the signals generated by the display control circuit 24, the digital signal DAu, the data start pulse signal SSP, and the data clock signal SCK are inputted to the upper source driver 23a, and the digital signal DAd, the data start pulse signal SSP, and the data clock signal SCK are inputted to the lower source driver 23b. The gate start pulse signal GSPu, the gate clock signal GCK, and the gate driver output control signal GOE are inputted to the upper gate driver 22a, and the gate start pulse signal GSPd, the gate clock signal GCK, and the gate driver output control signal GOE are inputted to the lower gate driver 22b.

In accordance with the digital signal DAu, the data start pulse signal SSP, and the data clock signal SCK, the upper source driver 23a sequentially generates, for each horizontal scanning period, data signals Sd1(UPPER) to Sdn(UPPER) (not shown) serving as analog voltages corresponding to pixel values of horizontal scanning lines of the image represented by the digital signal DAu. Then, the upper source driver 23a applies the data signals Sd1 (UPPER) to Sdn(UPPER) to the source lines S1(UPPER) to Sn(UPPER), respectively. Meanwhile, in accordance with the digital signal DAd, the data start pulse signal SSP, and the data clock signal SCK, the lower source driver 23b sequentially generates, for each horizontal scanning period, data signals Sd1(LOWER) to Sdn(LOWER) (not shown) serving as analog voltages corresponding to pixel values of horizontal scanning lines of the image represented by the digital signal DAd. Then, the lower source driver 23b applies the data signals Sd1(LOWER) to Sdn(LOWER) to the source lines S1(LOWER) to Sn(LOWER), respectively.

It should be noted that the split-screen driving is performed by storing the image signals in a frame memory (not shown), by reading out the stored data, and by scanning the upper- and lower-half regions while synchronizing the gate start pulse signals GSPu and GSPd. It should be noted that the gate start pulse signal GSPu to be applied to the gate line G1 and the gate start pulse GSPd to be applied to the gate line Gm+1 may be started simultaneously or with a given time interval therebetween.

Furthermore, the gate clock signal GCK is inputted to the upper and lower CS control circuits 25a and 25b for driving the storage capacitor lines CS1 to CS2m+1; the gate start pulse signals GSPu and GSPd are inputted to the upper and lower CS control circuits 25a and 25b, respectively. The upper and lower CS control circuits control the phases and widths of storage capacitance signal waveforms.

In the following, an example of the method for driving a liquid crystal display device with use of storage capacitance signals will be described with reference to the equivalent circuit of the liquid crystal display device 20 shown in FIG. 2 and FIGS. 6(a) and 6(b) showing the voltage waveforms (timings) of signals. FIG. 6(a) shows driving waveforms in the Nth frame, and FIG. 6(b) shows waveforms in the N+1th frame. It should be noted that FIG. 6(b) is opposite in polarity to FIG. 6(a).

According to the voltage waveforms shown in FIGS. 6(a) and 6(b), the first sub-pixel 1P serves as a bright sub-pixel, and the second sub-pixel 2P serves as a dark sub-pixel. The gate voltage is indicated by Vg. The source voltage is indicated by Vs. The voltages of the storage capacitor lines CS1 and CS2 of the first and second sub-pixels 1P and 2P are indicated by Vcs1 and Vcs2, respectively. The voltages of the pixel electrodes of the first and second sub-pixels 1P and 2P are indicated by Vlc1 and Vlc2, respectively.

In the present embodiment, the source voltage Vsp is given as positive polarity with respect to the central value Vsc of the source voltage in the Nth frame as shown in FIG. 6(a), and the source voltage Vsn is given as negative polarity in the next N+1th frame as shown in FIG. 6(b). Moreover, dot inversion is performed for each frame. The storage capacitor lines CS1 and CS2 receives signals, obtained by oscillating the first and second storage capacitor voltages Vcs1 and Vcs2 with the amplitude voltage Vad, which differ in phase by an amount of 180 degrees.

Changes in voltage of the signals over time in the Nth frame will be described below with reference to FIG. 6(a).

At time T1 when the gate voltage Vg changes from the gate-off voltage VgL to the gate-on voltage VgH, the first TFT 4a of the first sub-pixel P1 and the second TFT 4b of the second sub-pixel P2 are put in an ON state, so that the source voltage Vsp is applied to the first and second liquid crystal capacitors Clc1 and Clc2 and the first and second storage capacitors Ccs1 and Ccs2.

At time T2 when the gate voltage Vg changes from the gate-on voltage VgH to the gate-off voltage VgL, the first TFT 4a of the first sub-pixel P1 and the second TFT 4b of the second sub-pixel P2 are put in an OFF state, so that the first and second liquid crystal capacitors Clc1 and Clc2 and the first and second storage capacitors Ccs1 and Ccs2 are electrically disconnected from the data signal line 3. Immediately after this, the influence of a parasitic capacitance or the like brings about a pull-in effect in which the first and second sub-pixels P1 and P2 have pull-in voltages Vd1 and Vd2 generated therein, respectively. As a result, the first sub-pixel voltage Vlc1 of the first sub-pixel P1 and the second sub-pixel voltage Vlc2 of the second sub-pixel P2 are respectively defined as:

$Vlc1 = Vsp - Vd1$; and $Vlc2 = Vsp - Vd2$.

Further, at this point of time, the first and second storage capacitor voltages Vcs1 and Vcs2 are respectively defined as:

$Vcs1 = Vcom - Vad$; and $Vcs2 = Vcom + Vad$.

It should be noted that the first and second pull-in voltages Vd1 and Vd2 are defined by the following formula:

$Vd1, Vd2 = (VgH - VgL) \times Cgd/(Clc(V) + Cgd + Ccs)$, where the gate-on voltage VgH represents the gate-on voltage of the first or second TFT 4a or 4b, the gate off-voltage VgL represents the gate-off voltage of the first or second TFT 4a or 4b, Cgd represents the parasitic capacitance between the gate and drain of the first or second TFT 4a or 4b, Clc(V) represents the capacitance (capacitance value) of the liquid crystal capacitor, and Ccs represents the capacitance (capacitance value) of the storage capacitor.

Next, at time T3, the first storage capacitor voltage Vcs1 of the storage capacitor line CS1 changes from Vcom−Vad to Vcom+Vad, and the second storage capacitor voltage Vcs2 of the second storage capacitor line CS2 changes from Vcom−Vad to Vcom−Vad. At this point of time, the first sub-pixel voltage Vlc1 of the first sub-pixel P1 and the second sub-pixel voltage Vlc2 of the second sub-pixel P2 are respectively defined as:

$Vlc1 = Vsp - Vd1 + 2 \times K \times Vad$; and $Vlc2 = Vsp - Vd2 - 2 \times K \times Vad$.

It should be noted here that $K = Ccs/(Clc(V) + Ccs)$.

At time T4, the first storage capacitor voltage Vcs1 changes from Vcom+Vad to Vcom−Vad, and the second storage capacitor voltage Vcs2 changes from Vcom−Vad to Vcom+Vad. At this point of time, the first and second sub-pixel voltages Vlc1 and Vlc2 are respectively defined as:

$Vlc1 = Vsp - Vd1$; and $Vlc2 = Vsp - Vd2$.

At time T5, the first storage capacitor voltage Vcs1 changes from Vcom−Vad to Vcom+Vd, and the second storage capacitor voltage Vcs2 changes from Vcom+Vad to Vcom−Vad. At this point of time, the first and second sub-pixel voltages Vlc1 and Vlc2 are respectively defined as:

$Vlc1 = Vsp - Vd1 + 2 \times K \times Vad$; and $Vlc2 = Vsp - Vd2 - 2 \times K \times Vad$.

Then, the first sub-pixel voltage Vlc1 of the first sub-pixel P1 and the second sub-pixel voltage Vlc2 of the second sub-pixel P2 alternately repeat the operation of the time T4 and the operation of the time T5 for each multiple of a horizontal scanning period 1H until the next writing is performed at a point of time where Vg=VgH. Therefore, the effective values of the first and second sub-pixel voltages Vlc1 and Vlc2 are respectively defined as:

$Vlc1 = Vsp - Vd1 + K \times Vad$; and $Vlc2 = Vsp - Vd2 - K \times Vad$.

In the Nth frame, the effective voltages to be applied to the liquid crystal layers of the sub-pixels are respectively defined as:

$V1 = Vsp - Vd1 + K \times Vad - Vcom$; and $V2 = Vsp - Vd2 - K \times Vad - Vcom$.

Therefore, the first sub-pixel P1 serves as a bright pixel, and the second sub-pixel P2 serves as a dark pixel sub-pixel.

As described above, the multi-pixel driving is performed. It should be noted here that the above description omits parasitic capacitances such as the parasitic capacitance between the data signal line 3 and the first sub-pixel electrode 1a and the capacitance between the data signal line 3 and the second sub-pixel electrode 1b. Further, according to the above description, the first and second storage capacitor voltages Vcs1 and Vcs2 are out of phase with each other by 180 degrees for simplicity. However, as long as sub-pixels constituting a single pixel serve as a bright sub-pixel and a dark sub-pixel, the first and second storage capacitor voltages Vcs1 and Vcs2 do not need to be out of phase with each other by 180 degrees. Further, although the first and second storage capacitor voltages Vcs1 and Vcs2 are identical in pulse width to Vs, the present invention is not limited to this. For example, the pulse width may be changed in consideration of lack of charge in a storage capacitor due to a storage capacitance signal delay that is caused, for example, in cases where a large high-definition liquid crystal display device is driven.

Incidentally, as shown in FIGS. 7(a) and 7(b), the first and second storage capacitor voltages Vcs1 and Vcs2 can take such waveforms as to remain "High" or "Low" at the time 3 and at the time 4, respectively. That is, each of the first and second storage capacitor voltages Vcs1 and Vcs2 can be subjected to such potential control so as to have a rise or fall after each transistor has been turned off and maintain the rise or fall in that frame. It should be noted that the time T3 and the time T4 differ in terms of time by a single horizontal period (1H).

Changes in voltage waveforms in the Nth frame will be described below.

At time T0, Vcc1=Vcom−Vad, and Vcs2=Vcom+Vad. It should be noted that the voltage of a counter electrode is indicated by Vcom.

At time T1, the gate voltage Vg changes from the gate-off voltage VgL to the gate-on voltage VgH, so that the first and second TFT 4a and 4b are put in an ON state. As a result, the first and second sub-pixel voltages Vlc1 and Vlc2 rise to the source voltage Vsp, so that the first and second storage capacitor Ccs1 and Ccs2 and the first and second sub-pixel capacitors Cp1 and Cp2 are charged.

At time 2 when the gate voltage Vg changes from the gate-on voltage VgH to the gate-off voltage VgL, the first and second TFT 4a and 4b are put in an OFF state, so that the first and second storage capacitor Ccs1 and Ccs2 and the first and second sub-pixel capacitors Cp1 and Cp2 are electrically disconnected from the data signal line 3. Immediately after this, the influence of a parasitic capacitance or the like brings about a pull-in effect, so that Vlc1=Vsp−Vd1 and Vlc2=Vsp−Vd2.

At time T3, the first storage capacitor voltage Vcs1 changes from Vcom−Vad to Vcom+Vad. At time T4 (1H after the time T3), the second storage capacitor voltage Vcs2 changes from Vcom+Vad to Vcom−Vad. This results in:

$$Vlc1=Vsp-Vd1+2\times K\times Vad;\text{ and}$$

$$Vlc2=Vsp-Vd2-2\times K\times Vad.$$

It should be noted here that K=Ccs/(Clc+Ccs), where Ccs is the capacitance value of each storage capacitor (first or second storage capacitor Ccs1 or Ccs2) and Clc is the capacitance value of each liquid crystal capacitor (first or second liquid crystal capacitor Clc1 or Clc2).

From this, the effective voltages (V1 and V2) to be applied to the respective sub-pixel capacitors (first and second sub-pixel capacitors Cp1 and Cp2) are respectively defined as:

$$V1=Vsp-Vd1+2\times K\times Vad-Vcom;\text{ and}$$

$$V2=Vsp-Vd2-2\times K\times Vad-Vcom.$$

Therefore, the first sub-pixels P1 and P2 are formed in a single pixel P by the first and second sub-pixel capacitors Csp1 and Csp2, respectively.

This causes a reduction in the influence on drain effective potential by the bluntness of the waveforms of the first and second storage capacitor voltages Vcs1 and Vcs2, thereby effectively reducing unevenness of luminance.

These can be controlled by the upper and lower CS control circuits 25a and 25b to which the gate start pulse signals GSP and the gate clock signal GCK are inputted.

The following describes a method for driving an active-matrix substrate 10 and a liquid crystal display device 20 of the present embodiment each having both a split-screen structure and a multi-pixel structure.

That is, the active-matrix substrate 10 and the liquid crystal display device 20 of the present embodiment performs an image display of a one-frame period in accordance with the total amount of time integration of luminances to be displayed by an image display section in two sub-frame periods. It is assumed here, for example, that one of the two sub-frames is a first-half sub-frame covering a ½ frame period and the other is a second-half sub-frame covering a ½ frame period.

In this case, 100 gradations are displayed, for example, by supplying a voltage of gradations 200 in the first-half sub-frame and by supplying a voltage of 0 gradation in the second-half sub-frame. This makes it possible to both quickly charge pixels and reduce blurred motions in a liquid crystal display device 20 serving as a hold display device. Further, for example, pseudo-impulse driving can be enabled by displaying the first-half sub-frame brightly while displaying the second-half sub-frame darkly.

Figure 8:
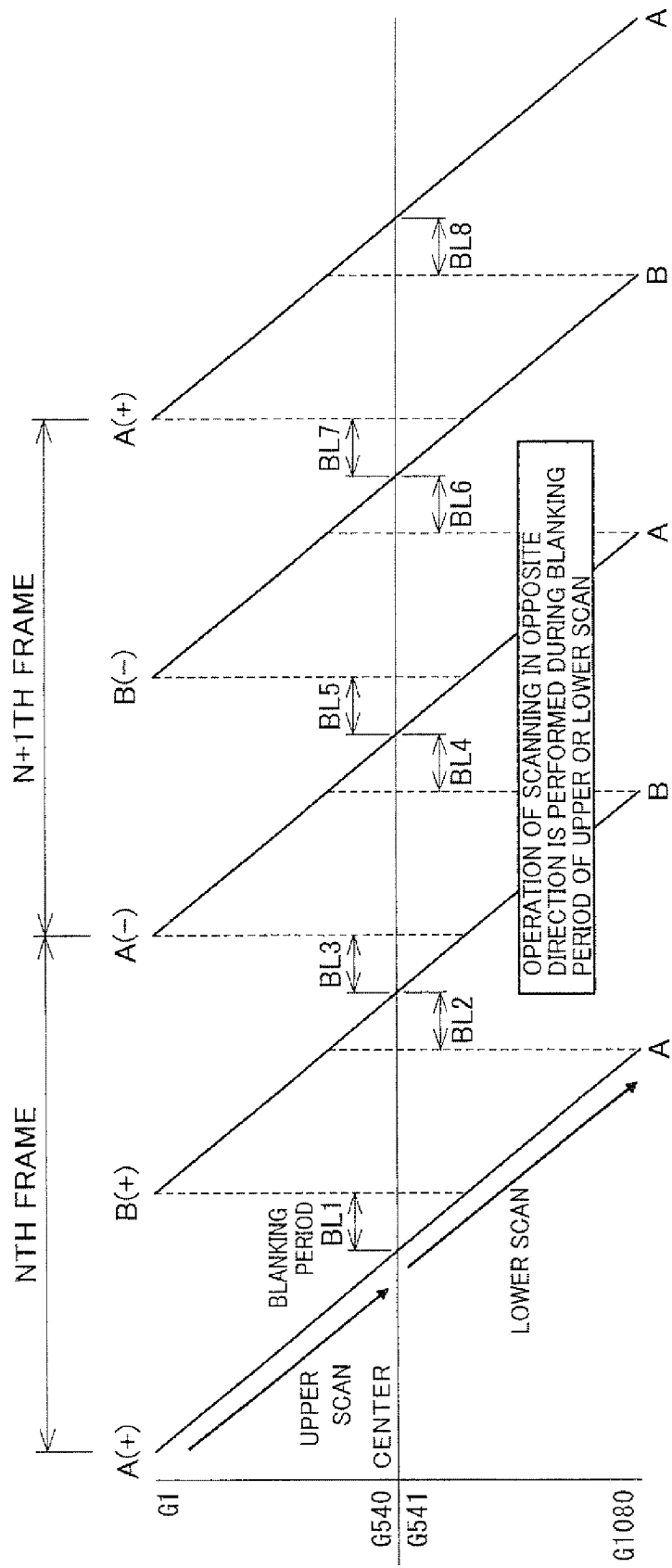
FIG. 8 is a timing chart showing a state in which the liquid crystal display device is driven in the Nth frame and the N+1th frame.

A specific driving method will be described below with reference to a timing chart shown in FIG. 8. FIG. 8 shows how an image signal is rewritten on a screen. FIG. 8 also shows a state in which an image display is rewritten in a period during which image signals of the Nth and N+1th frames are inputted. Further, the following indicates a full high-definition active-matrix substrate 10 and a full high-definition liquid crystal display device 20 in each of which an upper-half region having gate lines G1 to G540 and a lower-half region having gate lines G541 to G1080 can be independently driven.

It should be noted here that when attention is paid to pixels arrayed in a single horizontal line on a screen, first- and second-half frames of an identical frame have the same polarity. Moreover, the polarity is inverted for each frame. Further, for convenience of explanation, the positive/negative polarity with which to perform an operation of writing a frame and writing a signal in a blanking period is defined as the polarity of a data signal to be inputted in the earliest phase of the frame writing to the source line S1 located at the leftmost edge of the display area. For example, in cases where pixels are written in the uppermost gate line G1 and the leftmost source line S1(UPPER) of the upper-half region so as to have positive polarities, frame writing is performed with positive polarity in that region.

In the first-half sub-frame of the Nth frame, when the upper-half region is written with positive polarity, the lower-half region is written with positive polarity. Similarly, in the second-half sub-frame of the Nth frame, the upper-half region is written with positive polarity, and the lower-half region is also written with positive polarity. Similarly, in the first-half sub-frame of the N+1th frame, the upper-half region is written with negative polarity, and the lower-half region is also written with negative polarity. Further, in the second-half sub-frame of the N+1th frame, the upper-half region is written with negative polarity, and the lower-half region is also written with negative polarity.

As described above, the active-matrix substrate 10 and the liquid crystal display device 20 of the present embodiment each have both a split-screen structure and a multi-pixel structure.

Incidentally, according to the present embodiment, as shown in FIG. 2, the total number of storage capacitor lines Cs1 to Cs2m+1 is larger than the total number of scanning signal lines 2 by 1.

In this case, generally, it is necessary that upper and lower total capacitance loads respectively parasitic on upper and lower data signal lines 3u and 3d split from each other be identical. Therefore, in order to efficiently dispose an arrangement in which capacitance loads respectively parasitic on the upper and lower data signal lines 3u and 3d split from each other are identical, it is necessary that the upper and lower data signal lines 3u and 3d be split from each other in a position that overlaps a storage capacitor line Csm+1.

However, for example, in process of manufacturing an active-matrix substrate 10, electrostatic discharge (ESD) may occur because regions split from each other have no place for charge to escape through; therefore, the storage capacitor line Csm+1 may be undesirably short-circuited.

Figure 9:
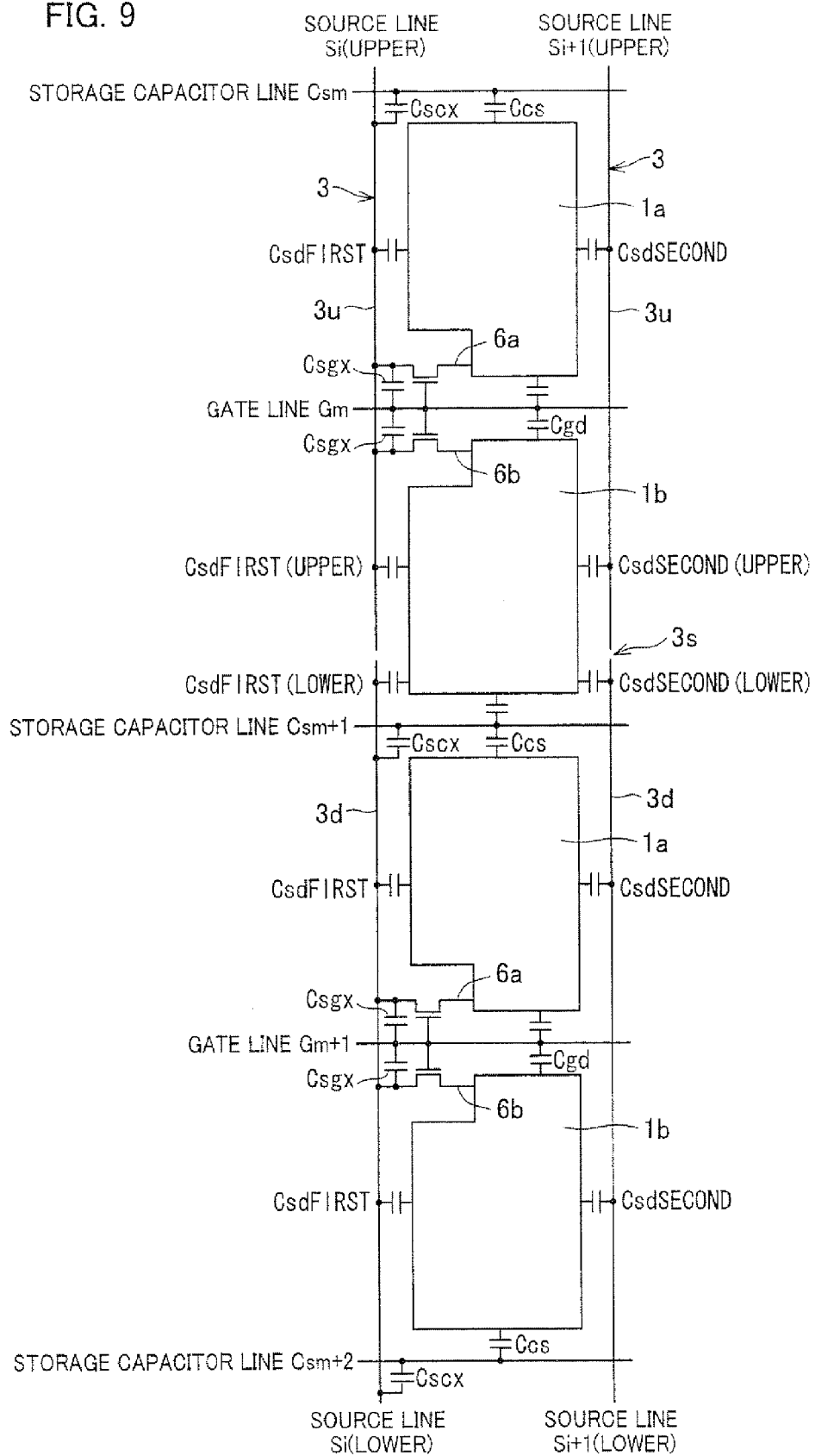
FIG. 9 is an equivalent circuit diagram showing parasitic capacitances of the liquid crystal display device.

In view of this, as shown in FIGS. 9 and 1, the present embodiment provides a data signal line split section 3s in a position that does not overlap the storage capacitor line Csm+1 (second storage capacitor wire 12 shown in FIG. 1) between the gate lines Gm Gm+1.

Specifically, the present embodiment forms the data signal line split section 3s between the gate line Gm and the storage capacitor line Csm+1. It should be noted that the data signal line split section 3s is not necessarily limited to this and may be formed between the gate line Gm+1 and the storage capacitor line Csm+1.

This prevents the storage capacitor line Csm+1 from being undesirably short-circuited in the data signal line split section 3s.

The problem here is whether the data signal line split section 3s may be anywhere between the gate lines Gm and Gm+1. This problem will be fully explained in the following.

First, according to the present embodiment, as shown above in FIG. 8, a one-frame period is split into a first-half sub-frame and a second-half sub-frame, and pseudo-impulse driving is performed such that the first-half sub-frame is displayed brightly while the second-half sub-frame is displayed darkly.

In such split-screen driving, as shown in FIG. 8, in cases where the gate start pulse signal GSPu (see FIG. 5) to be applied to the gate line G1 and the gate start pulse signal GSPd (see FIG. 5) to be applied to the gate line Gm+1 are started with a given time interval therebetween, the polarity of the upper data signal line 3u of the upper-half region and the polarity of the lower data signal line 3d of the lower-half region may be different. Alternatively, an image display period of the upper-half region and an image display period of the lower-half region may overlap a blanking period in terms of time.

Specifically, as shown in FIG. 8, each of the upper-half region and the lower-half region has a blanking period. Therefore, pixels in horizontal lines above and below the data signal line split section 3s have blanking periods BL1 to BL8 in sequence. In the blanking period BL1, the pixels have a mixture of pixels that have positive polarities (upper- and lower-half regions) at a fixed black gradation voltage. In the blanking period BL2, the pixels have a mixture of a pixel that has a negative polarity (upper-half region) and a pixel that has a positive polarity (lower-half region) at the fixed black gradation voltage. In the blanking period BL3, the pixels have a mixture of pixels that have positive polarities (upper- and lower-half regions) at the fixed black gradation voltage. In the blanking period BL4, the pixels have a mixture of a pixel that has a negative polarity (upper-half region) and a pixel that has a positive polarity (lower-half region) at the fixed black gradation voltage. In the blanking period BL5, the pixels have a mixture of pixels that have negative polarities (upper- and lower-half regions) at the fixed black gradation voltage. In the blanking period BL6, the pixels have a mixture of a pixel that has a negative polarity (upper-half region) and a pixel that has a negative polarity (lower-half region) at the fixed black gradation voltage. In the blanking period BL7, the pixels have a mixture of a pixel that has a negative polarity (upper-half region) and a pixel that has a negative polarity (lower-half region) at the fixed black gradation voltage. In the blanking period BL8, the pixels have a mixture of a pixel that has a positive polarity (upper-half region) and a pixel that has a negative polarity (lower-half region) at the fixed black gradation voltage.

The present embodiment presupposes normally black. Therefore, as the fixed black gradation voltage, a small-amplitude signal substantially identical to the counter voltage Vcom is applied.

Therefore, the range of positions where a data signal line 3 can be split into two parts varies depending on the polarity with which data signals are written into the upper- and lower-half regions and the signal waveforms. See below for more detailed explanations.

[Case of Identical Polarities]

Anywhere between the gate lines Gm and Gm+1.

[Case Where a Blanking Signal and a Data Writing Signal Overlap in Terms of Time and Have Identical Polarities]

Range A

[Case Where a Blanking Signal and a Data Writing Signal Overlap in Terms of Time and Have Opposite Polarities]

Strict range B

[Case of Overlap between Times When a Data Writing Signal Has Opposite Polarities]

Strictest range C

The reason for the classification will be explained with reference to FIG. 9 mainly from the viewpoint of the electrical characteristics of the first and second sub-pixel electrodes 1a and 1b. FIG. 9 is an equivalent circuit diagram showing the electrical characteristics of the vicinity of a region where each data signal line 3 is split into two parts by a data signal line split section 3s. In FIG. 9, while a parasitic capacitance Csd related to a source line Si serving as a data signal line 3 is indicated with a sign "FIRST", a parasitic capacitance Csd related to a source line Si+1 is indicated with a sign "SECOND". The signs "FIRST" and "SECOND" are distinguished from each other such that the sign "FIRST" indicates, among the data signal lines 3 respectively provided on the right and left sides of the first and second sub-pixel electrodes 1a and 1b, a data signal line 3 via which charge is supplied to the first and second sub-pixel electrodes 1a and 1b and the sign "SECOND" indicates a data signal line 3 via which no charge is supplied to the first and second sub-pixel electrodes 1a and 1b.

Further, the following explains the influence of a parasitic capacitance Csd on the effective value of sub-pixel electrode voltage, and therefore omits, for simplicity, the influence of a storage capacitor on the effective value of sub-pixel electrode voltage in multi-pixel driving.

It should be noted first that in a region where there is no cut in a data signal line 3, the effective value Vlc–eff of the voltage of the first or second sub-pixel electrode 1a or 1b at the input gradation voltage Vs is normally expressed by the following formula. However, it is assumed that there is no difference in optimum counter voltage (difference between the counter voltage Vcom and an optimum counter voltage) and the data signal lines 3 has identical gradation voltages applied thereto as well in a blanking period.

$$Vlc\text{–}\mathit{eff}(\text{normal display area}) = Vs - Vs \times (Csd\text{FIRST} - Csd\text{SECOND})/Cpix$$

The foregoing formula shows, for example, that in the upper-half region, the parasitic capacitance between the upper data signal line 3u and the first drain electrode 6a and the parasitic capacitance between the upper data signal line 3u and the first sub-pixel electrode 1a exert an influence on a display.

Similarly, the effective value of sub-pixel electrode voltage at a constant gradation voltage in a pixel region 1 having a data signal line split section 3 by which a data signal line 3 has been cut is defined as follows. It should be noted that the input gradation voltage Vs(UPPER) is supplied to the pixel region 1 and the input gradation voltage Vs(LOWER) to the second sub-pixel P2, i.e., to a lower half of the pixel region 1 is opposite in polarity to the input gradation voltage Vs(UPPER).

$Vlc\text{-}eff(Cut) \approx Vs(\text{UPPER}) - Vs(\text{UPPER}) \times (Csd\text{FIRST}(\text{UPPER}) - Csd\text{SECOND}(\text{UPPER}))/Cpix + Vs(\text{LOWER}) \times (Csd\text{FIRST}(\text{LOWER}) - Csd\text{SECOND}(\text{LOWER})/Cpix$ $Vs(\text{UPPER}) > 0$ $Vs(\text{LOWER}) > 0$ $Cpix = Cls + Ccs + Cgd + \Sigma Csd$ Σ: Summation Here, as in the present embodiment, in cases where a scan of an upper-half pixel area (upper-half region) and a scan a lower-half pixel area (lower-half region) are not started at identical timings, the scan of one of the pixel areas enters a blanking period during the scan of the other pixel area. Therefore, even when identical gradations are displayed, the upper and lower data signal lines $3u$ and $3d$ differ in voltage magnitude, thereby exerting an influence on the effective values of the voltages of the first and second sub-pixel electrodes $1a$ and $1b$. For another example, in cases where the upper-and lower-half pixel areas display different gradations, there occurs a defective display such as a bright line, a black line, or the like unless the pixel region 1 in which the data signal line 3 has been cut performs a display identical to those performed by other pixel regions 1 to which the same gradation has been inputted.

In cases where the input gradation voltage Vs is an intermediate gradation, the conditions under which the influence on the effective values can be said to be at a nonproblematic level in terms of display quality are as follows:

$|Vlc\text{-}eff(\text{normal display area}) - Vlc\text{-}eff(\text{Cut})| \leq 1 \text{ mV}$  (Formula 1)

From the foregoing mathematical formula, it is only necessary to suppress the influence of the lower data signal line $3d$ (input gradation voltage Vs(LOWER) in this case) via which no input gradation voltage is transmitted to the upper-half pixel area. That is, it is only necessary to satisfy the following conditions:

$|Vs(\text{LOWER}) \times (Csd\text{FIRST}(\text{LOWER}) - Csd\text{SECOND}(\text{LOWER}))/Cpix| \approx 0$ For example, in cases where the data signal lines 3 have a single-wire structure and the data signal lines 3 and the first and second sub-pixel electrodes $1a$ and $1b$ constitute a symmetrical structure, the data signal lines 3 may be split at any part as long as a desired data signal line 3 is connected to the first and second TFTs $4a$ and $4b$.

Thus, as long as the parasitic capacitances CsdFIRST and CsdSECOND of the lower data signal line $3d$ take on identical values, there is no dependence on input signals.

In cases where the data signal lines 3 and the first and second sub-pixel electrodes $1a$ and $1b$ constitute a symmetrical structure, there is no bias toward either of the parasitic capacitances CsdFIRST and CsdSECOND of the lower data signal line $3d$. Therefore, there may be a cut anywhere as long as a desired source signal is supplied to the first and second TFTs $4a$ and $4b$.

Meanwhile, in cases where the data signal lines 3 and the pixel electrodes form an asymmetrical shape for some reason such as zigzag-shaped data signal lines 3 or edge-notched first and second sub-pixel electrodes $1a$ and $1b$, there occurs a bias toward either of the parasitic capacitances CsdFIRST and CsdSECOND of the lower data signal line $3d$. Therefore, if a cut is made in a give position, the bias toward either of the parasitic capacitances CsdFIRST and CsdSECOND of the lower data signal line $3d$ remains intact, so that the difference between the parasitic capacitances CsdFIRST and CsdSECOND may not be cancelled. In view of this, in order to separate the parasitic capacitances CsdFIRST and CsdSECOND and to adjust the capacitance values independently, a structure is used in which each of the data signal lines 3 diverges into two branch lines. In the present specification, the structure in which each of the data signal lines 3 diverges into two branch lines is referred to also as "source ladder structure".

Figure 10:
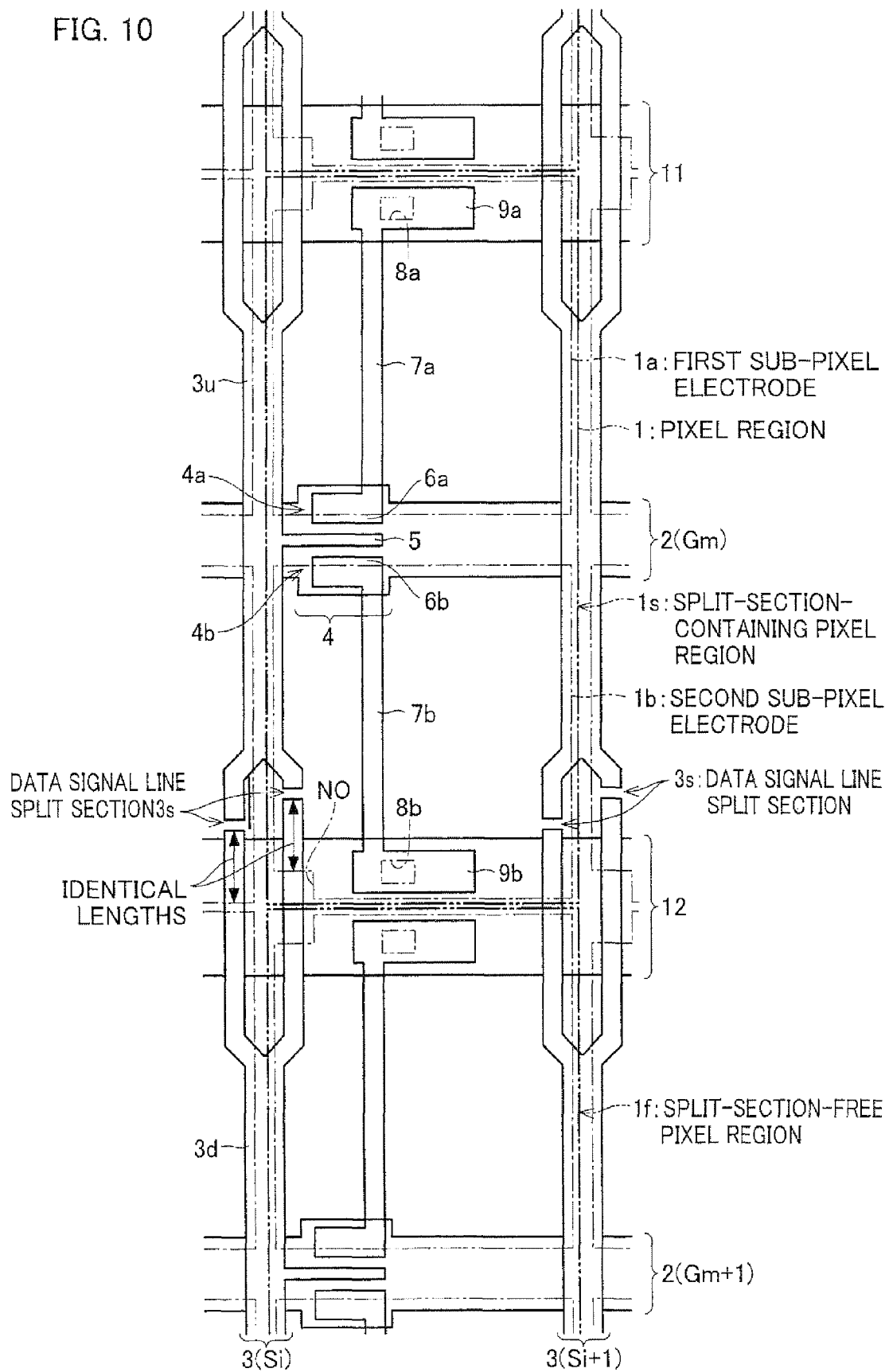
FIG. 10 is a plan view showing how the vicinity of a data signal line split section is arranged in the liquid crystal display device in cases where data signal lines and pixel electrodes are asymmetrical.

With reference to FIG. 10, the following describes a case where the data signal lines 3 and the first and second sub-pixel electrodes $1a$ and $1b$ are asymmetrical.

In FIG. 10, the second sub-pixel electrode $1b$ has an edge notch NO on the second storage capacitor wire 12, and the data signal lines 3 and the first and second sub-pixel electrodes $1a$ and $1b$ produce an asymmetrical appearance. It should be noted that the edge notch NO of the second sub-pixel electrode $1b$ will be fully described below in Embodiments 3 and 4.

In this case, each of the data signal lines 3 diverges into two branch lines so that the parasitic capacitances CsdFIRST(LOWER) and CsdSECOND(LOWER) with respect to the lower data signal line $3d$ below the second sub-pixel electrode $1b$ and the data signal line split section $3s$ are cut off so as to take on identical capacitance values. By cutting off the two branch lines of the data signal line 3 at such points that the two branch lines overlap the second sub-pixel electrode $1b$ for identical distances, it becomes possible that the parasitic capacitances CsdFIRST(LOWER) and CsdSECOND(LOWER) take on identical capacitance values. For example, an error in distance for which the "FIRST" and "SECOND" data signal lines 3 overlap the second sub-pixel electrode $1b$ is approximately ±4 μm (corresponding to the strictest range C) in cases where the gradation is always the same and the data signal line input voltages in the upper- and lower-half regions are opposite in polarity to the counter voltage Vcom, approximately ±6 μm (corresponding to the strict range B) in cases where the blanking period has V0 (black gradation) and the data signal line input voltages in the upper- and lower-half regions are opposite in polarity to the counter voltage Vcom, or approximately ±8 μm (corresponding to the range A) in cases where the blanking period has V0 (black gradation) and the data signal line input voltages in the upper- and lower-half regions are identical in polarity to the counter voltage Vcom.

Further, by inputting identical gradation voltages to the split-containing pixel region $1s$ containing the data signal line split sections $3s$ and the other split-free pixel region $1f$ free of a data signal line split section $3s$, it becomes possible that the split pixel region $1s$ and the other split-free pixel region $1f$ have identical luminances. This makes it possible to prevent the split-containing pixel region $1s$ containing the data signal line split sections $3s$ from appearing as a bright line or a black line.

That is, in FIG. 10, in order to prevent the split-containing pixel region $1s$ containing the data signal line split sections $3s$ from appearing as a bright line or a black line, it is necessary that the split-containing pixel region $1s$ containing the data signal line split sections $3s$ and the other split-free pixel region $1f$ free of a data signal line split section $3s$ have identical luminances by receiving identical gradation voltages. In terms of electrical conditions, it is necessary that the difference in effective value between the sub-pixel electrode voltages of the split-containing pixel region $1s$ and the split-free pixel region $1f$ be not more than 1 mV. The term "difference in effective value between the sub-pixel electrode voltages" here means a value defined by (Formula 1). However, for simplicity, the (Formula 1) omits the influence of a storage capacitor on the effective value of sub-pixel voltage in multi-pixel driving. Therefore, in practice, the differences in effective value of sub-pixel voltage between bright pixels and between dark pixels by multi-pixel driving are compared.

In order to satisfy the conditions, it is necessary that among the parasitic capacitances Csd between the data signal lines 3 and the second sub-pixel electrode 1b of the data signal line split section 3s, the parasitic capacitances CsdFIRST (LOWER) and CsdSECOND(LOWER) with respect to the lower data signal line 3d be identical in FIG. 10.

As for the distinction between upper and lower parasitic capacitances Csd, when the data signal line 3 via which charge is supplied to the first and second sub-pixel electrodes 1a and 1b is on the upper side, the size of the parasitic capacitance Csd of the lower data signal line 3d is discussed. The purpose is to equalize with the effective values of sub-pixel electrode voltage of other pixel regions 1 to which charge is supplied from the upper side.

In cases where the data signal lines 3 and the second sub-pixel electrode 1b are asymmetrical, the position of the data signal line split section 3s is preferably changed by diverging each of the data signal lines 3 into two branch lines (source ladder structure), as shown in FIG. 10, so that the parasitic capacitances CsdFIRST(LOWER) and CsdSECOND (LOWER) are identical.

The foregoing is summarized as follows:
A structure in which data signal lines 3 and pixel electrodes are symmetrical: Each of the data signal lines 3 may be cut off at any point (independence from signals).
A structure in which data signal lines 3 and pixel electrodes are asymmetrical: A point at which each of the data signal lines 3 is split needs to be determined in accordance with a difference in polarity or the like between input signals. In cases where the difference in effective value exceeds the permissible value, the size of the parasitic capacitances CsdFIRST(LOWER) and CsdSECOND(LOWER) needs to be adjusted by a source ladder structure.

Based on the above description, the present embodiment is arranged such that a data signal line split section 3s is formed near a second storage capacitor wire 12 as shown in FIG. 1.

In this case, the following values were obtained by calculating, in an actual liquid crystal display device 20, a total capacitance load parasitic on each upper data signal line 3u above (upper-half region) the data signal line split section 3s and a total capacitance load parasitic on each lower data signal line 3d below (lower-half region) the data signal line split section 3s.

Forty-five-inch full high definition display (diagonal measure of 45 inches, 1080×1920 resolution)→Ratio of the upper total capacitance load to the lower total capacitance load=1: 1.002

Fifty-seven-inch full high definition display (diagonal measure of 57 inches, 1080×1920 resolution)→Ratio of the upper total capacitance load to the lower total capacitance load=1:1.002

Sixty-five-inch full high definition display (diagonal measure of 65 inches, 1080×1920 resolution)→Ratio of the upper total capacitance load to the lower total capacitance load=1: 1.001

These results show that the difference in capacitance is approximately 0.02% in each case and that the difference in influence on display quality by a difference in signal delay between data signals is at a sufficiently nonproblematic level.

As described above, the active-matrix substrate 10 of the present embodiment is arranged such that: each of the data signal lines 3 is split into two parts at the data signal line split section 3s where the number of scanning signal lines 2 is divided in half; and the data signal line split section 3s is formed in a region that does not overlap the second storage capacitor wire 12.

Therefore, the data signal line split section 3s at which the data signal line 3 is split into two parts does not overlap the second storage capacitor wire 12. This makes it difficult for the second storage capacitor wire 12 to be electrically short-circuited with the data signal line 3 split into two parts.

It should be noted that although the arrangement of the present embodiment causes such a difference in capacitance, by an overlap with the first or second storage capacitor wire 11 or 12, between the upper and lower data signal lines 3u and 3d by which the capacitance load parasitic on the data signal line 3 has been split, such a difference in capacitance is at such a level that a signal delay in the data signal line 3 causes no serious defect in a display.

Further, the active-matrix substrate 10 of the present embodiment is preferably arranged such that: the scanning signal lines 2 are provided as gate lines G1 to G2m (where m is a natural number except 0); each of the data signal lines 3 is split into two parts between the gate lines Gm and Gm+1; and the data signal line split section of each of the data signal lines 3 is formed near the storage capacitor line Csm+1 provided between the gate line Gm and the gate line Gm+1. Specifically, the data signal line split section 3s of each of the data signal lines 3 is preferably formed within ±8 μm, or more preferably within ±6 μm, from the storage capacitor line Csm+1 provided between the gate line Gm and the gate line Gm+1.

For this reason, there is substantially no difference in capacitance between the upper and lower signal lines 3u and 3d by which the electrostatic load capacitance parasitic on the data signal line 3 has been split. For example, even in cases where such driving is performed that the upper- and lower-half regions differ in polarity, the difference in capacitance is surely at such a level that a signal delay between the upper and lower data signal lines 3u and 3d causes no serious defect in a display.

Further, the active-matrix substrate 10 of the present embodiment is preferably arranged such that when each of the data signal lines 3 is split at the data signal line split section 3s into an upper data signal line 3u intersected by the gate lines G1 to Gm (where m is a natural number except 0), i.e., by the first-half scanning signal lines, and a lower data signal line 3d intersected the gate lines Gm+1 to G2m, i.e., by the second-half scanning signal lines, each of the data signal lines 3 is split into two parts so that the parasitic capacitance CsdFIRST(LOWER) between (i) the second sub-pixel P2 supplied with a voltage by the source line Si(UPPER), which is an upper data signal line 3d, and (ii) the source line Si(LOWER), which is a lower data signal line 3d, is substantially identical to the parasitic capacitance CsdSECOND (LOWER) between (iii) the source line Si+1(LOWER), which is a lower data signal line 3d adjacent to the second sub-pixel P2, and (iv) the second sub-pixel P2.

That is, it is preferable that each of the data signal lines 3 is split into two parts so that the parasitic capacitance CsdFIRST (LOWER) between (i) the second sub-pixel P2 supplied with a voltage by the source line Si(UPPER), which is an upper data signal line 3d, and (ii) the source line Si(LOWER), which is a lower data signal line 3d, is substantially identical to the parasitic capacitance CsdSECOND(LOWER) between (iii) the source line Si+1(LOWER), which is a lower data signal line 3d adjacent to the second sub-pixel P2 and opposite to the source line Si(LOWER), which is a lower data signal line 3d (iv) the second sub-pixel P2. As described above, "substantially identical" suffices as "identical".

With this, even in cases where the data signal line 3 has an asymmetrical relationship with a sub-pixel electrode, it is possible to virtually eliminate a difference in capacitance between the upper and lower data signal lines 3u and 3d by which the capacitance load parasitic on the data signal line 3 has been split.

Further, the active-matrix substrate 10 of the present embodiment is arranged such that: the first and second sub-pixel electrodes 1a and 1b are formed asymmetrically with respect to center lines of the first and second sub-pixel electrodes 1a or 1b between two source lines Si and Si+1, the center lines being parallel to the two source lines Si and Si+1; the source lines Si and Si+1 have diverging regions where the source lines diverges; and the split sections of the source lines Si and Si+1 are respectively formed in the diverging regions so as to equalize parasitic capacitances with respect to the two source lines Si and Si+1 adjacent to the asymmetrical first and second sub-pixel electrodes 1a and 1b.

With this, specifically, in cases where the first and second sub-pixel electrodes 1a and 1b are formed asymmetrically, it is possible to virtually eliminate a difference in capacitance between the upper and lower data signal lines 3u and 3d by which the capacitance load parasitic on the data signal line 3 has been split.

Further, the active-matrix substrate 10 of the present embodiment is preferably arranged such that each of the data signal lines 3 and each of the pixels are respectively included in planes separated by the interlayer insulating films 15a and 15b.

As a result, for example, if there are interlayer insulating films 15a and 15b between the second sub-pixel electrode 1b and the data signal line 3, it is possible to make it difficult for the second sub-pixel electrode 1b and the data signal line 3 to be short-circuited with each other even at the time of electrostatic discharge.

Further, the active-matrix substrate 10 of the present embodiment is preferably arranged such that the interlayer insulating film 15a contains an insulating film made of a resin.

For example, whereas $SiN_X$, $SiO_2$, or the like formed by CVD or the like has difficulty in being shaped into a film having a thickness of the order of microns, a resin such as an acrylic resin is easily shaped in a film having a thickness of several microns. For this reason, it is possible to more suitably make it difficult for the second sub-pixel electrode 1b and the data signal line 3 to be short-circuited with each other even at the time of electrostatic discharge. Furthermore, the film can be made thicker, and the parasitic capacitance between the second sub-pixel electrode 1b and the data signal line 3 can be suitably reduced.

Further, whereas the relative permittivity of $SiN_X$ is approximately 7.0, the relative permittivity of an available acrylic resin is approximately 3.0. Therefore, the parasitic capacitance can be suitably reduced also in terms of relative permittivity.

Further, the active-matrix substrate 10 of the present embodiment is preferably arranged such that the interlayer insulating film 15a contains an insulating film made of a spin-on glass (SOG) material. The "spin-on glass (SOG) material" here means a material from which a glass film (silica-based film) can be formed by a coating method such as spin coating.

For example, whereas $SiN_X$, $SiO_2$, or the like formed by CVD or the like has difficulty in being shaped into a film having a thickness of the order of microns, a spin-on glass (SOG) material having a Si—O—C bond or a Si—C bond as its skeleton is easily shaped into a film having a thickness of several microns.

For this reason, it is possible to more suitably make it difficult for the second sub-pixel electrode 1b and the data signal line 3 to be short-circuited with each other even at the time of electrostatic discharge. Furthermore, the film can be made thicker, and the parasitic capacitance between the second sub-pixel electrode 1b and the data signal line 3 can be suitably reduced.

Further, whereas the relative permittivity of $SiN_X$ is approximately 7.0, the relative permittivity of an available spin-on glass material is approximately 4.0.

Further, in the liquid crystal display device 20 of the present embodiment, the upper and lower CS (storage capacitor line) control circuits 25a and 25b function as storage capacitor wire voltage control sections for controlling each of the potential of the first storage capacitor wire 11 and the potential of the second storage capacitor wire 12 individually by performing potential control on each of the first and second storage capacitor wires 11 and 12 individually.

With this, for example, the first sub-pixel P1 can be made bright and the second sub-pixel P2 can be made dark. This makes it possible to realize split-pixel driving for improving the dependence of γ characteristics on viewing angles. Further, the dependence of γ characteristics on viewing angles in an upward direction and the dependence of γ characteristics on viewing angles in a downward direction can be made substantially equal.

Further, the liquid crystal display device 20 of the present embodiment is preferably arranged such that the upper and lower CS (storage capacitor line) control circuits 25a and 25b control the potential of each the first and second storage capacitor wires 11 and 12 so that the potential rises or falls after the first or second TFT 4a or 4b has been turned off and the rise or fall continues until the first or second TFT 4a or 4b is turned off in a next frame.

This causes a reduction in the influence on drain effective potential by the bluntness of the waveforms of the voltages of the first and second storage capacitor wires 11 and 12, thereby effectively reducing unevenness of luminance.

Embodiment 2

Another embodiment of the present invention will be described below with reference to FIG. 11. It should be noted that arrangements except those described in the present embodiment are the same as those described above in Embodiment 1. Further, for convenience of explanation, members having the same functions as those shown in the figures of Embodiment 1 are given the same reference numerals, and will not be described below.

Figure 11:
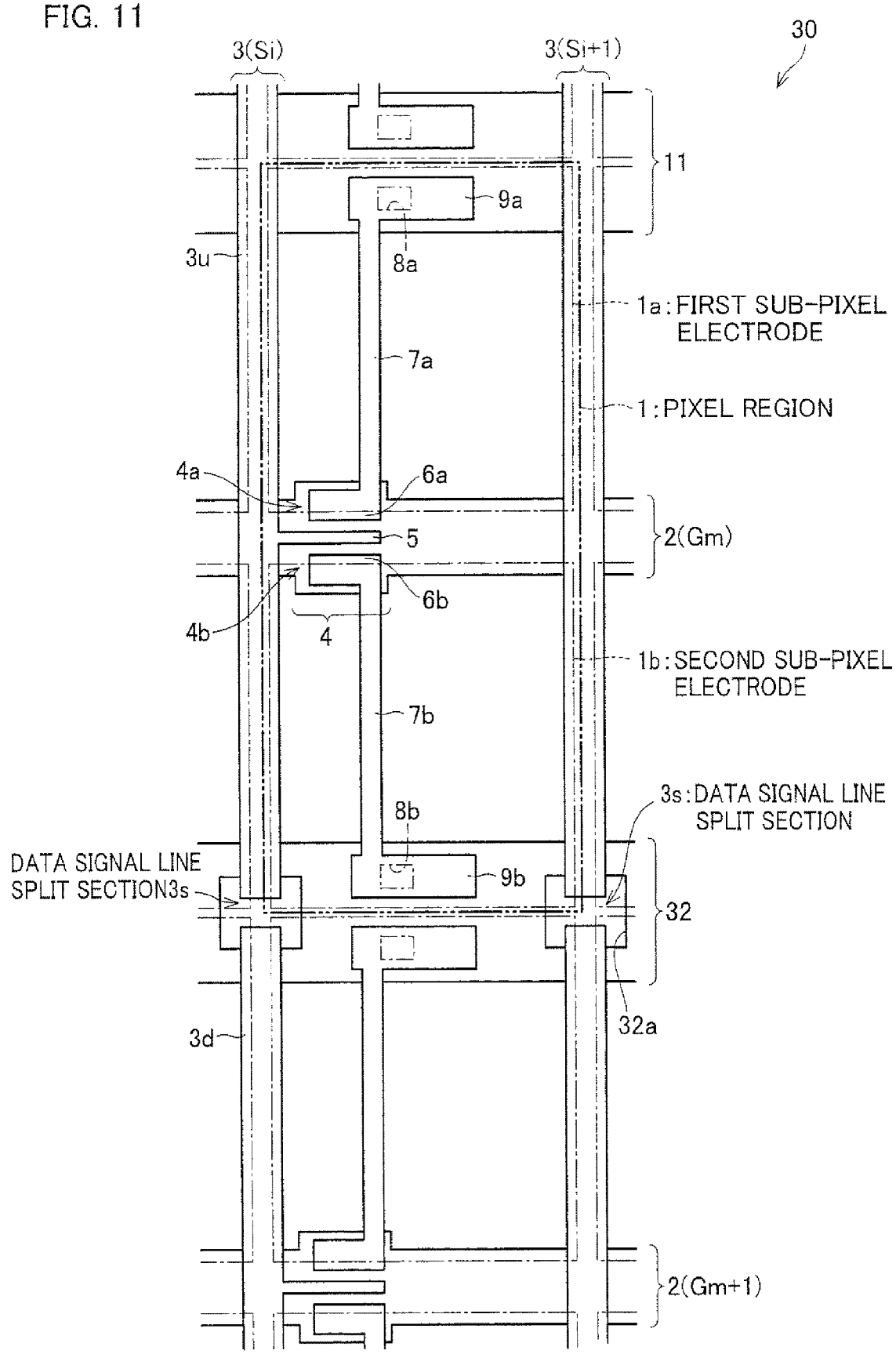
FIG. 11 is a plan view of another embodiment of the active-matrix substrate according to the present invention.

FIG. 11 is a plan view of an arrangement of an active-matrix substrate 30 of the present embodiment, and shows the vicinity of a region where each data signal line 3 is split into two parts. The second storage capacitor wire 32 has a second storage capacitor wire notched section 32a, provided near an intersection between the second storage capacitor wire 32 and a data signal line 3, which serves as a notch region. The data signal line 3 is split into two parts at the second storage capacitor wire notched section 32a.

Therefore, the total capacitance load parasitic on the data signal line 3 can be equally split into the upper and lower data signal lines 3u and 3d split from each other.

Further, if the upper and lower data signal lines 3*u* and 3*d* split from each other are short-circuited, it is possible to destroy and separate the short-circuited portion by laser irradiation or the like.

Embodiment 3

Another embodiment of the present invention will be described below with reference to FIG. 12. It should be noted that arrangements except those described in the present embodiment are the same as those described above in Embodiment 1. Further, for convenience of explanation, members having the same functions as those shown in the figures of Embodiment 1 are given the same reference numerals, and will not be described below.

Figure 12:
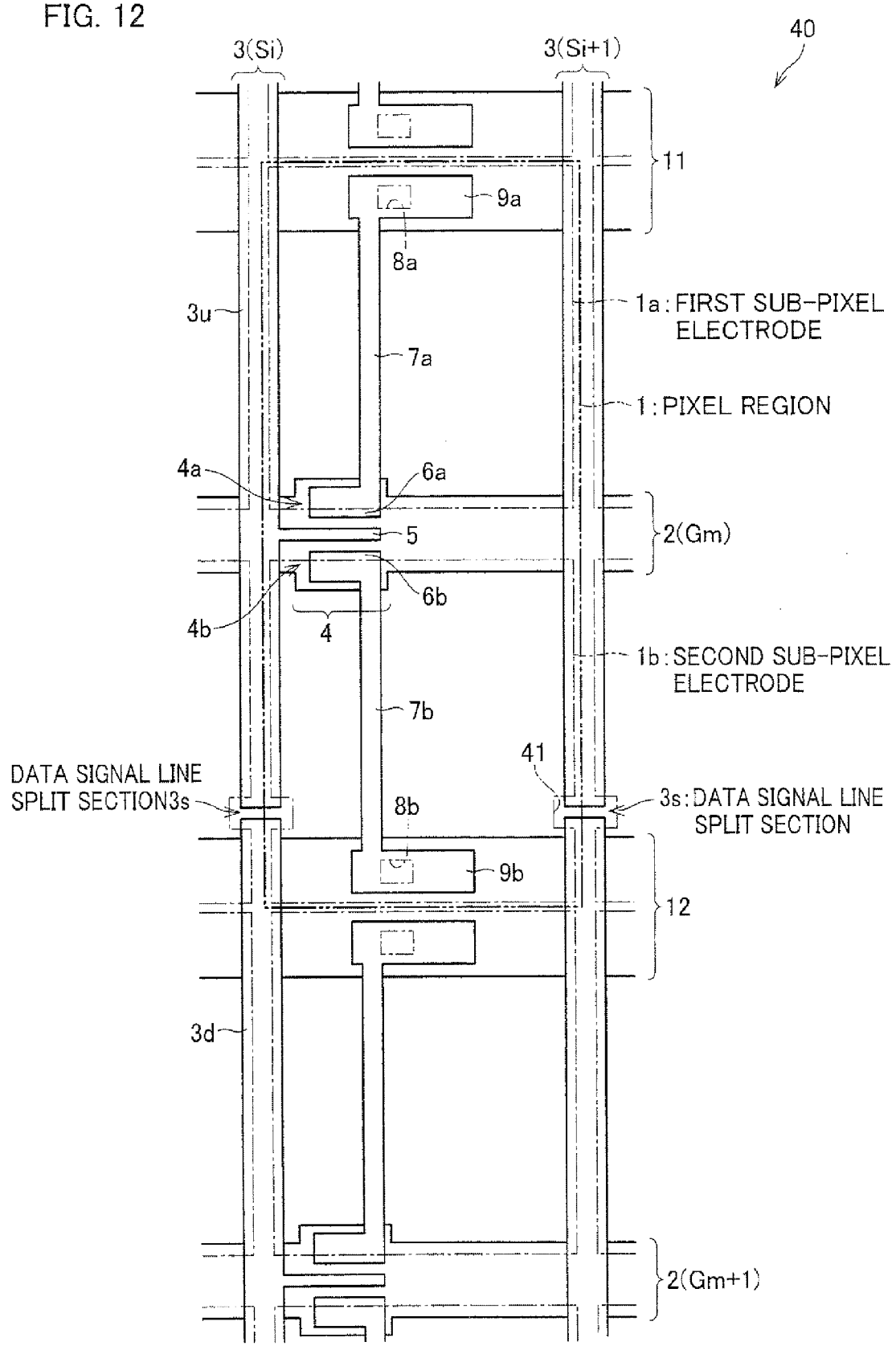
FIG. 12 is a plan view of still another embodiment of the active-matrix substrate according to the present invention.

FIG. 12 is a plan view of an arrangement of an active-matrix substrate 40 of the present embodiment, and shows the vicinity of a region where each data signal line 3 is split into two parts.

The present embodiment has the same position of a data signal line split section 3*s* as Embodiment 1. However, in the active-matrix substrate 40 of the present embodiment, the second sub-pixel electrode 1*b* has a pixel electrode notched section 41, provided in the position of the data signal line split section 3*s*, which serves as a notch region.

Therefore, for example, even when electrostatic discharge destroys the interlayer insulating films 15*a* and 15*b* (see FIG. 3) between the second sub-pixel electrode 1*b* and the data signal line 3, it is possible to make it difficult for the second sub-pixel electrode 1*b* and the data signal line 3 to be short-circuited.

Embodiment 4

Another embodiment of the present invention will be described below with reference to FIG. 13. It should be noted that arrangements except those described in the present embodiment are the same as those described above in Embodiments 1 to 3. Further, for convenience of explanation, members having the same functions as those shown in the figures of Embodiment 1 are given the same reference numerals, and will not be described below.

Figure 13:
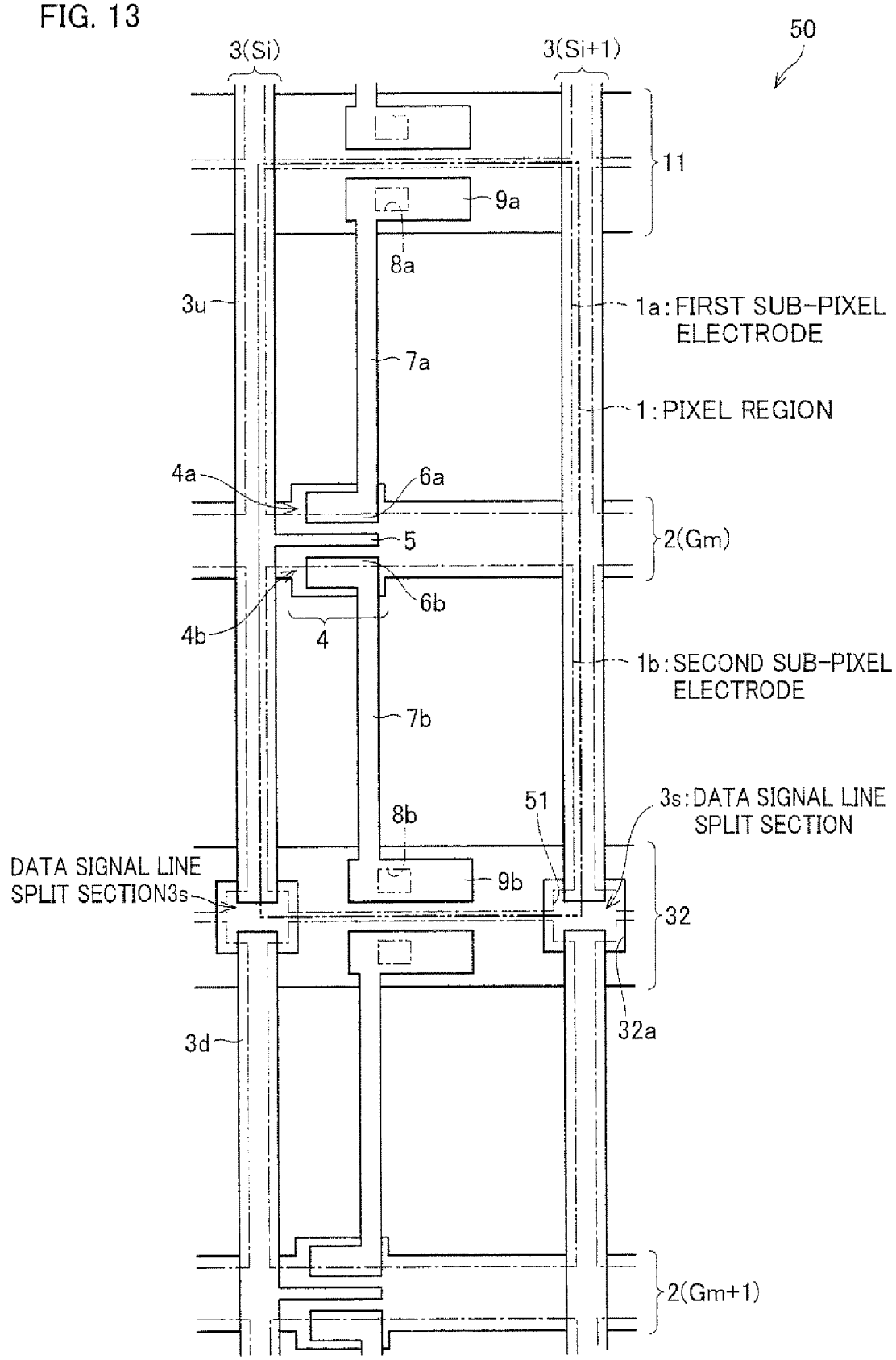
FIG. 13 is a plan view of still another embodiment of the active-matrix substrate according to the present invention.

FIG. 13 is a plan view of an arrangement of an active-matrix substrate 50 of the present embodiment, and shows the vicinity of a region where each data signal line 3 is split into two parts.

The present embodiment is a combination of Embodiments 2 and 3. The second storage capacitor wire 32 has a second storage capacitor wire notched section 32*a*, provided near an intersection between second storage capacitor wire 32 and a data signal line 3, which serves as a notch region. The data signal line 3 is split into upper and lower data signal lines 3*u* and 3*d* at the second storage capacitor wire notched section 32*a*.

The second sub-pixel electrode 1*b* has a pixel electrode notched section 51 provided in the position of the second storage capacitor wire notched section 32*a*.

Therefore, the total capacitance load parasitic on the data signal line 3 can be equally split into the upper and lower data signal lines 3*u* and 3*d* split from each other.

Further, if the upper and lower data signal lines 3*u* and 3*d* split from each other are short-circuited, it is possible to destroy and separate the short-circuited portion by laser irradiation or the like.

Furthermore, for example, even when electrostatic discharge destroys the interlayer insulating films 15*a* and 15*b* (see FIG. 3) between the second sub-pixel electrode 1*b* and the data signal line 3, it is possible to make it difficult for the second sub-pixel electrode 1*b* and the data signal line 3 to be short-circuited.

Embodiment 5

Another embodiment of the present invention will be described below with reference to FIG. 14. It should be noted that arrangements except those described in the present embodiment are the same as those described above in Embodiments 1 to 4. Further, for convenience of explanation, members having the same functions as those shown in the figures of Embodiment 1 are given the same reference numerals, and will not be described below.

Figure 14:
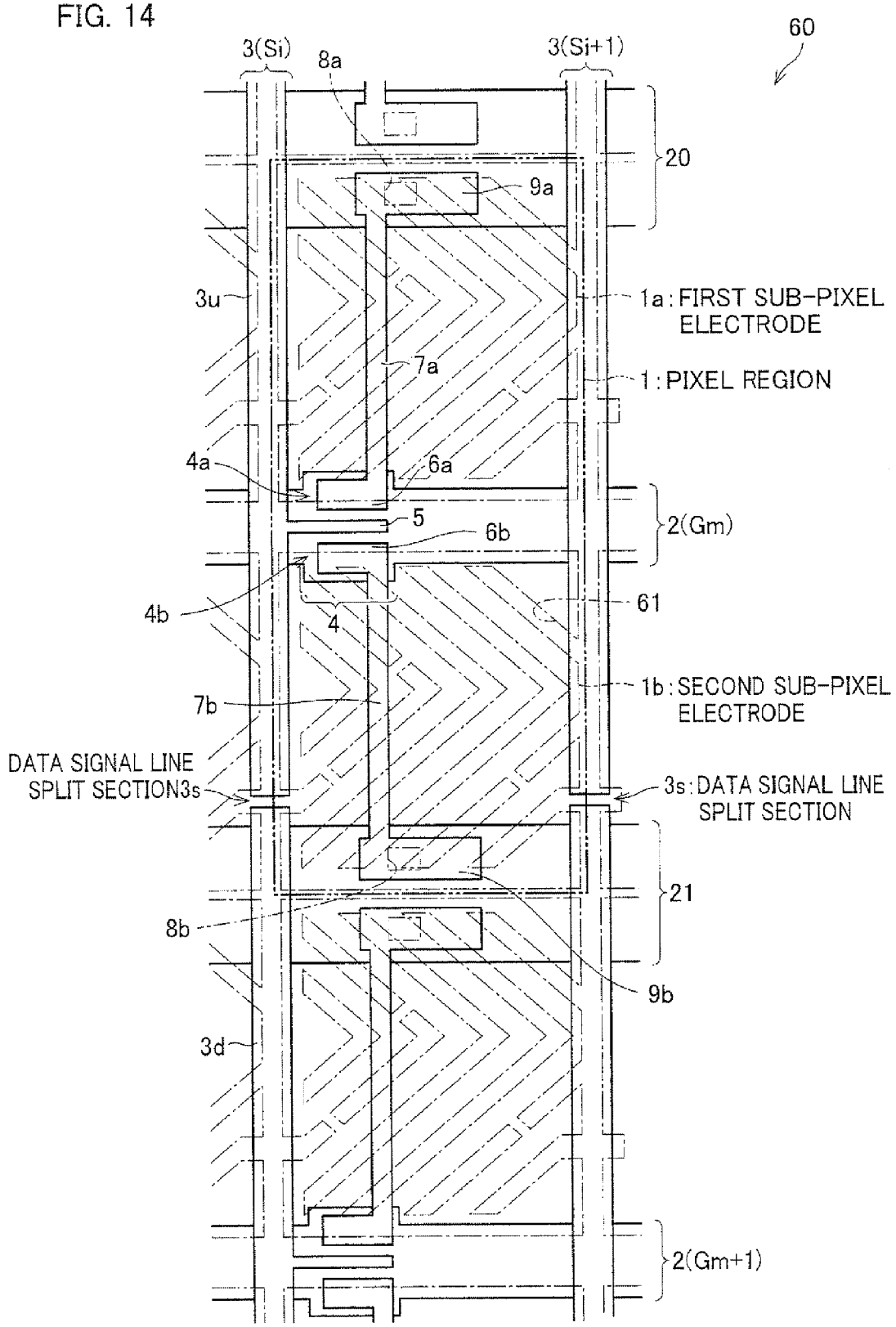
FIG. 14 is a plan view of still another embodiment of the active-matrix substrate according to the present invention.

FIG. 14 is a plan view of an arrangement of an active-matrix substrate 60 of the present embodiment, and shows the vicinity of a region where each data signal line 3 is split into two parts.

In the active-matrix substrate 60 of the present embodiment, a data signal line split section 3*s* is formed in a region that overlaps a pixel electrode slit 61 serving as a slit section for controlling liquid crystal molecular alignment.

As shown in FIG. 14, the active-matrix substrate 60 can be an MVA (Multi-domain Vertical Alignment) arrangement. That is, each of the first and second sub-pixel electrodes 1*a* and 1*b* is provided with a pixel electrode slit (liquid crystal molecular alignment control slit), forming the shape of a letter V rotated by 90 degrees, which controls liquid crystal molecular alignment. According to the MVA arrangement, each pixel electrode of the active-matrix substrate 60 is provided with a slit (electrode-removed pattern), and a counter electrode of a counter substrate is provided with a liquid crystal molecular alignment control protrusion (rib). The MVA arrangement utilizes a fringe field that is formed by the slit and the rib. The fringe field makes it possible to disperse liquid crystal molecules so that the liquid crystal molecules are aligned in a plurality of directions, thereby realizing a wide viewing angle.

A liquid crystal display panel is formed by laminating an active-matrix substrate 60 and a color filter substrate formed so as to include red (R), green (G), and blue (B) colored layers provided in a matrix manner so as to correspond to pixels of the active-matrix substrate 10 and light-blocking black matrices provided between the colored layers and by injecting and sealing in liquid crystals. By connecting a driver (liquid crystal driving LSI) and the like to the liquid crystal panel and by mounting a polarization plate and a backlight, a liquid crystal display device of the present invention is formed.

According to the active-matrix substrate 60 of the present embodiment, the data signal line split section 3*s* is formed in a region that overlaps the pixel electrode slit 61 that controls liquid crystal molecular alignment, so that it is not necessary to separately provide a notch region, for example, in the second sub-pixel electrode 1*b*. This makes it possible to suppress a reduction in aperture ratio.

Embodiment 6

Another embodiment of the present invention will be described below with reference to FIGS. 15 through 17. It should be noted that arrangements except those described in the present embodiment are the same as those described above in Embodiments 1 to 5. Further, for convenience of explanation, members having the same functions as those shown in the figures of Embodiments 1 to 5 are given the same reference numerals, and will not be described below.

The present embodiment describes a television receiver employing any one of the active-matrix substrates 10, 30, 40, 50, and 60 of Embodiments 1 to 5.

Figure 15:
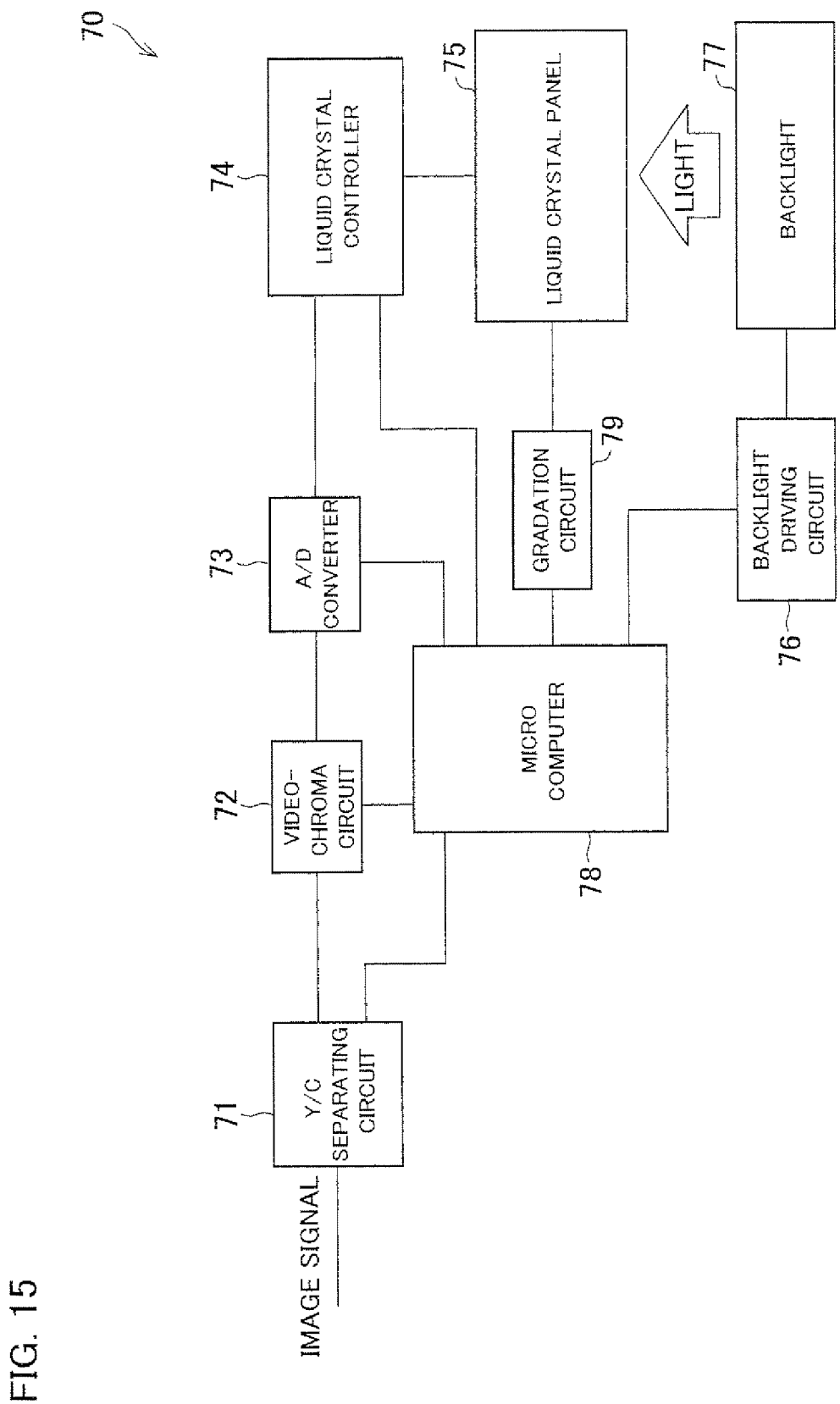
FIG. 15 is a block diagram showing an arrangement of a liquid crystal display device according to the present invention for use in a television receiver.

FIG. 15 shows a circuit block of a liquid crystal display device 70 for use in a television receiver.

As shown in FIG. 15, the liquid crystal display device 70 is arranged so as to include a Y/C separating circuit 71, a video-chroma circuit 72, an A/D converter 73, a liquid crystal controller 74, a liquid crystal panel 75, a backlight driving circuit 76, a backlight 77, a microcomputer 78, and a gradation circuit 79.

First, in the liquid crystal display device 70 thus arranged, the Y/C separating circuit 71 receives an input image signal, which is a television signal, and separates the signal into a luminance signal and a color signal. The video-chroma circuit 72 converts the luminance signal and the color signal into three primary colors red (R), green (G), and blue (B) of light. Furthermore, the analog RGB signal is converted by the A/D converter 73 into a digital RGB signal, and then the digital RGB signal is inputted to the liquid crystal controller 74. The liquid crystal panel 75 receives the digital RGB signal from the liquid crystal controller 74 at a predetermined timing and receives RGB gradation signals from the gradation circuit 79, thereby displaying an image. The microcomputer 78 controls the whole system as well as these processes. It should be noted that a display can be performed in accordance with various image signals such as an image signal based on a television broadcast, an image signal corresponding to an image taken by a camera, and an image signal supplied via an Internet line.

Figure 16:
FIG. 16 is a block diagram showing a relationship between the liquid crystal display for use in a television receiver and a tuner section.

Further, a tuner section 81 shown in FIG. 16 outputs an image signal by receiving a television broadcast, and the liquid crystal display device 70 displays an image in accordance with the image signal outputted from the tuner section 81.

Figure 17:
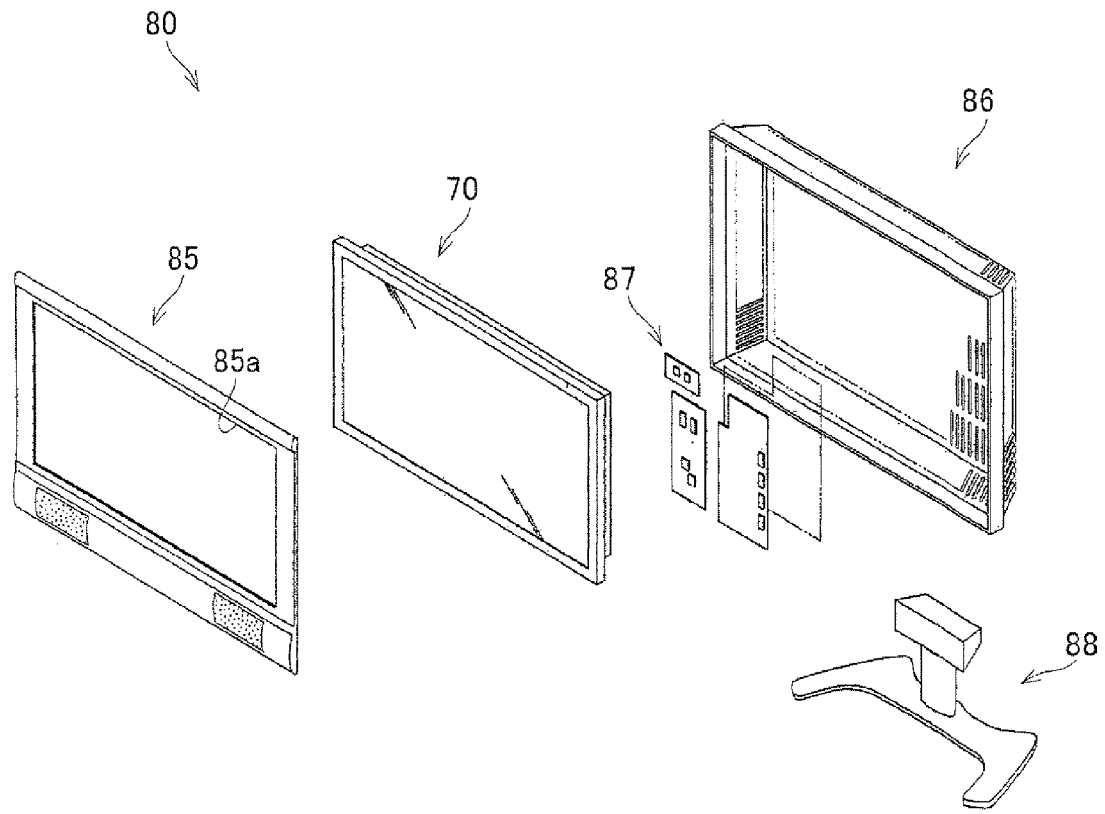
FIG. 17 is an exploded view of an arrangement of a television receiver including the liquid crystal display device.
Figure 18:
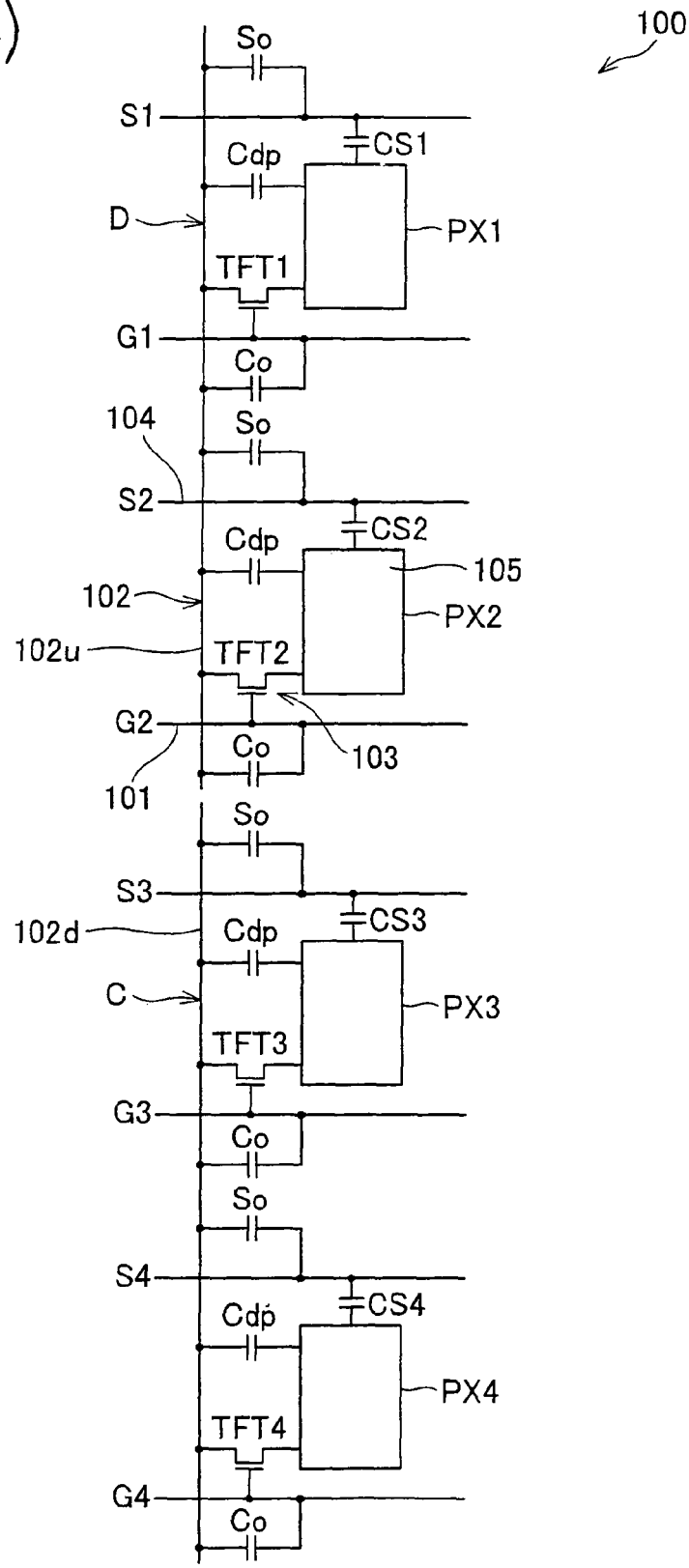
FIG. 18 is an equivalent circuit diagram showing an arrangement of a conventional liquid crystal display device.

When the liquid crystal display device 70 serves as a television receiver 80, the television receiver 80 is arranged such that the liquid crystal display device 70 is sandwiched between first and second housings 85 and 86 so as to be encompassed by the first and second housings 85 and 86, for example, as shown in FIG. 17.

The first housing 85 is formed with an opening 85a via which an image to be displayed by the liquid crystal display device 70 is transmitted. Further, the second housing 86 covers a back surface of the liquid crystal display device 70, is provided with an operation circuit 87 for operating the liquid crystal display device 70, and has a supporting member 88 attached onto a lower side thereof.

Thus, a liquid crystal display device 70 serving as a display device of the present embodiment includes an active-matrix substrate 10, 30, 40, 50, or 60.

Further, a television receiver 80 of the present embodiment includes a liquid crystal display device 70 and a tuner section 81 for receiving a television broadcast.

This makes it possible to provide a liquid crystal display device 70 and a television receiver 80 each including an active-matrix substrate 10, 30, 40, 50, or 60 in which a data signal line 3 split into two parts and a second storage capacitor wire 12 are hardly electrically short-circuited in the case of a combination of a split-screen structure and a multi-pixel structure.

The present invention is not limited to the description of the embodiments above, but may be altered by a skilled person within the scope of the claims. An embodiment based on a proper combination of technical means disclosed in different embodiments is encompassed in the technical scope of the present invention.

Although the present embodiment has been described exclusively as a liquid crystal display device, the present invention is not limited to this. For example, it is possible to arrange an organic EL display device including: an organic EL panel which includes (i) a color filter substrate, (ii) such an active-matrix substrate as described above, the active-matrix substrate being disposed so as to face the color filter substrate, and (iii) an organic EL layer disposed between the color filter substrate and the active-matrix substrate; and a driver or the like connected to an external terminal of the panel.

Further, the present invention is applicable not only to a liquid crystal display device and an organic EL display device but also to any display device that is constituted by an active-matrix substrate.

INDUSTRIAL APPLICABILITY

The present invention is applicable to an active-matrix substrate in which a plurality of display elements are driven, a display element driving device, a display device including the display element driving device, and a television receiver. Specifically, usable examples of the display device encompass an active-matrix liquid crystal display device and a display employing an EL (electroluminescence) element.

The invention claimed is:

1. An active-matrix substrate comprising:
   scanning signal lines;
   data signal lines;
   storage capacitor wires; and
   a plurality of pixels, disposed proximate intersections between the scanning signal lines and the data signal lines, each of which includes a plurality of sub-pixels,
   each of the data signal lines being split into two parts at a region where the total number of scanning signal lines provided to all pixels is divided in half,
   each of the data signal lines having a split section formed in a region that does not overlap a storage capacitor wire.

2. The active-matrix substrate as set forth in claim 1, wherein:
   the scanning signal lines are first to 2×mth (where m is an natural number except 0) scanning signal lines;
   each of the data signal lines is split into two parts between the mth scanning signal line and the m+1th scanning signal line; and
   the split section of each of the data signal lines is formed near the mth storage capacitor wire provided between the mth scanning signal line and the m+1th scanning signal line.

3. The active-matrix substrate as set forth in claim 1, wherein:
   each of the sub-pixels has a sub-pixel electrode, interposed between two data signal lines, which is formed asymmetrically with respect to a center line of the sub-pixel electrode, the center line being parallel to the two data signal lines;
   each of the data signal lines has a diverging region where the data signal line diverges; and
   the split section of the data signal line is formed in the diverging region so as to equalize parasitic capacitances with respect to the two data signal lines adjacent to the asymmetrical sub-pixel electrode.

4. The active-matrix substrate as set forth in claim 1, wherein when each of the data signal lines is split at the split section into a first-half data signal line intersected by the first-half scanning signal lines and a second-half data signal line intersected by the second-half scanning signal lines, each of the data signal lines is split into two parts so that the value of a parasitic capacitance between (i) a pixel supplied with a voltage by the first-half data signal line intersected by the first-half scanning signal lines and (ii) the second-half data signal line intersected by the second-half scanning signal line is substantially identical to the value of a parasitic capacitance between (iii) a second-half data signal line, intersected by the second-half scanning signal lines, which is adjacent to the pixel and (iv) the pixel.

5. The active-matrix substrate as set forth in claim 1, wherein: the split section of each of the data signal lines overlaps a notch defined in at least one storage capacitor wire.

6. The active-matrix substrate as set forth in claim 1, wherein each of the sub-pixels has a sub-pixel electrode having a notch region formed in a portion where the split section of each of the data signal lines and the sub-pixel electrode overlap.

7. The active-matrix substrate as set forth in claim 6, wherein the notch region formed in the sub-pixel electrode serves as a slit section for controlling liquid crystal molecular alignment.

8. The active-matrix substrate as set forth in claim 1, wherein each of the data signal lines and a sub-pixel electrode of each of the sub-pixels are respectively included in planes separated by an interlayer insulating film.

9. The active-matrix substrate as set forth in claim 8, wherein the interlayer insulating film contains an insulating film made of a resin.

10. The active-matrix substrate as set forth in claim 8, wherein the interlayer insulating film contains an insulating film made of a spin-on glass (SOG) material.

11. A display device comprising an active-matrix substrate as set forth in claim 1.

12. The display device as set forth in claim 11, wherein:
the sub-pixels consist of a first sub-pixel having a first sub-pixel electrode connected to a drain electrode of a first transistor and a second sub-pixel electrode connected to a drain electrode of a second transistor;
the first sub-pixel forms a first storage capacitance between the first sub-pixel electrode and a first storage capacitor wire, which is a storage capacitor wire disposed on the first sub-pixel electrode, and the second sub-pixel forms a second storage capacitance between the second sub-pixel electrode and a second storage capacitor wire, which is a storage capacitor wire disposed on the second sub-pixel electrode; and
by performing potential control on each of the storage capacitor wires individually, the potential of the first sub-pixel electrode and the potential of the second sub-pixel electrode are each controlled individually.

13. The display device as set forth in claim 12, wherein:
the potential rises or falls after the first or second transistor has been turned off; and
the potential of each of the storage capacitor wires is controlled so that the rise or fall continues until the first or second transistor is turned off in a next frame.

14. A television receiver comprising: a display device as set forth in claim 11; and a tuner section for receiving a television broadcast.

15. An active-matrix substrate comprising:
scanning signal lines;
data signal lines;
storage capacitor wires; and
a plurality of pixels, disposed proximate intersections between the scanning signal lines and the data signal lines, each of which includes a plurality of sub-pixels,
each of the data signal lines being split into two parts at a region where the number of scanning signal lines is divided in half,
each of the data signal lines having a split section provided in a region that does not overlap a storage capacitor wire,
each of the sub-pixels has a sub-pixel electrode, interposed between two data signal lines, which is formed asymmetrically with respect to a center line of the sub-pixel electrode, the center line being parallel to the two data signal lines;
each of the data signal lines has a diverging region where the data signal line diverges; and
the split section of the data signal line is formed in the diverging region so as to equalize parasitic capacitances with respect to the two data signal lines adjacent to the asymmetrical sub-pixel electrode.

16. An active-matrix substrate comprising:
scanning signal lines;
data signal lines;
storage capacitor wires; and
a plurality of pixels, disposed proximate intersections between the scanning signal lines and the data signal lines, each of which includes a plurality of sub-pixels,
each of the data signal lines being split into two parts at a region where the number of scanning signal lines is divided in half,
each of the data signal lines having a split section provided in a region that does not overlap a storage capacitor wire,
wherein when each of the data signal lines is split at the split section into a first-half data signal line intersected by the first-half scanning signal lines and a second-half data signal line intersected by the second-half scanning signal lines, each of the data signal lines is split into two parts so that the value of a parasitic capacitance between (i) a pixel supplied with a voltage by the first-half data signal line intersected by the first-half scanning signal lines and (ii) the second-half data signal line intersected by the second-half scanning signal line is substantially identical to the value of a parasitic capacitance between (iii) a second-half data signal line, intersected by the second-half scanning signal lines, which is adjacent to the pixel and (iv) the pixel.

* * * * *